United States Patent [19]

Terao et al.

[11] Patent Number: 5,846,625
[45] Date of Patent: Dec. 8, 1998

[54] OPTICAL RECORDING MEDIUM AND INFORMATION PROCESSING APPARATUS USED THEREFOR

[75] Inventors: Motoyasu Terao, Nishitama-gun; Tetsuya Nishida, Nakano-ku; Yasushi Miyauchi, Akishima; Akemi Hirotsune, Higashimurayama, all of Japan

[73] Assignees: Hitachi, Ltd., Tokyo; Hitachi Maxell, Ltd., Osaka-fu, both of Japan

[21] Appl. No.: 519,977

[22] Filed: Aug. 28, 1995

[30] Foreign Application Priority Data

Aug. 26, 1994 [JP] Japan ................................. 6-201762

[51] Int. Cl.[6] ............................................ B32B 3/00
[52] U.S. Cl. ...................... 428/64.1; 428/64.2; 428/64.4; 428/64.5; 428/64.6; 428/457; 428/913; 430/270.13; 430/495.1; 430/945; 369/275.1; 369/283; 369/288
[58] Field of Search ................................. 428/64.1, 64.2, 428/64.4, 64.5, 64.6, 457, 913; 430/270.12, 270.13, 495.1, 945; 369/275.1, 275.4, 283, 288

[56] References Cited

U.S. PATENT DOCUMENTS

| | | | |
|---|---|---|---|
| 4,954,379 | 9/1990 | Nishida et al. | 428/64 |
| 5,063,097 | 11/1991 | Hirota et al. | 428/65 |
| 5,171,618 | 12/1992 | Suzuki | 428/64 |
| 5,346,740 | 9/1994 | Ohno et al. | 428/64 |

FOREIGN PATENT DOCUMENTS 41 15 321 A1  5/1991  Germany.
A-4-228127  8/1992  Japan.

OTHER PUBLICATIONS

Takeo Ohta, et al. "Million Cycle Overwritable Phase Change Optical Disk Media", *Optical Data Storage Topical Meeting (1989)*, SPIE, vol. 1078, pp. 27–34.

*Primary Examiner*—Elizabeth Evans
*Attorney, Agent, or Firm*—Pennie & Edmonds, LLP

[57] ABSTRACT

An optical disk apparatus using an optical disk in which a layer (a reflectivity adjustment layer) in which the optical constants are changed by melting at the time of irradiation of light is provided separately from a recording layer using a phase change, and the reflectivity at a portion having a high reflectivity on the recording track is 40% or lower at the time of irradiation of strong light, and the reflectivity at the same portion is 60% or higher at the time of irradiation of weak light, wherein when the laser power is set to a power which is higher than the power at which the optical constants of the reflectivity adjustment layer are greatly changed at the time of rewriting and at which a high melting-point component is not melted, remaining of an unerased portion during rewriting due to a difference in reflectivity between the written mark portion and the other portions can be prevented and the possible number of rewritings can be increased, and hence an optical disk which has a high recording sensitivity, can be read by a CD player or others, and can be rewritten by overwriting and an optical disk apparatus using it can be obtained.

53 Claims, 3 Drawing Sheets

OPTICAL RECORDING MEDIUM AND INFORMATION PROCESSING APPARATUS USED THEREFOR

BACKGROUND OF THE INVENTION

The present invention relates to an information recording film, a manufacturing method therefor, and an information recording medium and more particularly, for example, to an optical recording medium which can record and reproduce information obtained by frequency-modulating an analog signal such as video or audio or digital information such as data of an electronic computer, a facsimile signal, or a digital audio signal in real time by an energy beam such as a laser beam or an electron beam and an information processing apparatus and an information reading method used for it.

Conventionally, a rewritable optical disk using a phase-change recording film which is changed between the crystalline state and the amorphous state by illumination of a laser beam, in which the reflectivity is high at one of a written mark of a recording portion and a non-written portion between the recording portions, can be read as in a compact disk (CD), or a CD-ROM, or a read-only optical disk of an optical video disk player. The laminating structure of such an optical disk is, for example, Au layer for increasing the reflectivity—dielectric layer—recording layer including at least GE, Sb, and Te—dielectric layer—light reflecting Au layer from the light entry side. In the case of a compact disk, the specification (generally called a Red-book) specifies that the reflectivity at a portion where no information bit is provided is 70% or higher and the reproduced signal modulation degree is 60% or more, so that when a laser beam spot approaches a pit, the reflectivity decreases to 28% or lower. However, a normal compact disk device can read data even at a reflectivity of 60 to 70% and also can read data even at a modulation degree a little less than 60%. According to the specification (Orange-book) of a write-once compact disk (called a CD recordable (CD-R)) which can record only once, the reflectivity of a write-once compact disk is more than 65% on the tracking groove.

On the other hand, an optical disk in which the first Au layer in a laminating structure equivalent to the aforementioned laminating structure of Au layer—dielectric layer—Ge—Sb—Te recording layer—dielectric layer—light reflection layer is changed to a low melting-point metal layer is described in Japanese Patent Application Laid-Open 5-73961. The patent describes that in the case of this optical disk, when the thickness of each layer is selected so that the reflectivity at a part of the laser beam illuminated portion at the time of reading where the low melting-point metal layer is melted increases and the reflectivity at the other parts is low, only at the part where the low melting-point metal layer is melted, written marks of the Ge—Sb—Te recording layer can be seen optically and the written marks can be read at a high resolution. Namely, this is a super resolution reading optical disk.

On the other hand, in a phase-change recording film of a GeSbTe system or an InSbTe system, when a high-power laser beam is illuminated many times such as more than $10^5$, the rewriting characteristic is lowered by material flow of the recording film. Therefore, a method for preventing material flow of a recording film has been studied.

For example, in Japanese Patent Application Laid-Open 4-228127, a method for preventing material flow by microcellulization of a recording film is disclosed and in a document of T. Ohta et al., "Optical Data Storage", '89 Proc. SPIE, 1078, 27 (1989), a method for preventing material flow of a recording film by making a recording film thin so as to lower the thermal capacity and using a phenomenon that the effect of the adhesive force with the neighboring layer increases is disclosed.

In the case of a disk which can be read by a compact disk player, the absorptivity at a portion (a portion in the crystalline state) with a high reflectivity is "100—reflectivity"% at maximum, so that it is extremely lower than the reflectivity of about 20% and the absorptivity of about 80% of a normal rewritable optical disk. Even at a low linear velocity of 1.3 to 1.4 m/s, it is requested that the recording laser power is about 30 mW on the disk. The efficiency of optic's of the optical head is about 40%, so that a semiconductor laser having an output of 70mW or more is necessary and the optical head cannot be used in a long life time and at a low price. In the case of a recording film including a main component of Ge—Sb—Te satisfying the condition of reflectivity, a problem arises that the margin of the compositional range is small.

On the other hand, another problem of such an optical recording medium is that since there is an extremely great difference in the light absorptivity between the high reflectivity portion and the low reflectivity portion (this portion is generally a written mark), when new information is overwritten (rewriting by overwriting), how to generate heat due to light absorption is greatly different between a portion which is used to be a written mark and a portion which is not used to and a written mark newly formed is distorted.

When conventional recording films are used as a rewritable phase-change type recording film, problems arise that (1) the number of times of rewriting is not sufficient, (2) when the number of times of rewriting is increased, the crystallization velocity slows down, and (3) when the number of times of rewriting is increased, the intensity of a reproduced signal is not sufficient.

When an attempt is made to form a written mark smaller than the laser beam spot diameter, a problem conventionally arises that the size of a written mark is varied by a slight variation in the laser power or an error in the autofocus.

SUMMARY OF THE INVENTION

An object of the present invention is to solve the aforementioned conventional problem of a recording film and provide an optical recording medium in which the margin of the compositional range of a recording film is large and a distortion of a written mark and a variation in the size thereof are suppressed and an information processor using it.

In this specification, a word of "phase change" is used not only for a phase change between the crystalline state and the amorphous state but also for a phase change in a broad sense such as between melting (a change to the liquid phase) and recrystallization, and a phase change between the crystalline state and other crystalline state.

To accomplish the above object, in an optical recording medium of the present invention which is formed on a substrate directly or via a protective layer and records and reproduces information by a change generated on a recording layer by illumination of a laser beam:

(1) The optical recording medium has a layer (a reflectivity adjustment layer separately from the recording layer) in which the optical constants of the reflectivity adjustment layer are changed by illumination of light and the reflectivity at the time of illumination of weak light (low power) is relatively higher than the reflectivity at the time of illumination of strong light.

(2) It is more desirable that an optical recording medium described in Item (1) has a layer (a reflectivity adjustment layer) in which the optical constant is changed by illumination of light separately from a recording layer, and the reflectivity at a portion having a high reflectivity on the recording track is 60% or higher at the time of illumination of weak light, and the reflectivity at the same portion is 40% or lower at the time of illumination of strong light. It is desirable that the aforementioned condition of reflectivity is satisfied at a wave length of 780 nm, or 830 nm, or between them. A case that the aforementioned condition is satisfied at another wave length is also included in the present invention.

The aforementioned reflectivity is measured by the method described below. Light is focused by an optical head having a light source with a wave length specified as a wave length when a medium is used and having a stopping lens with a numerical aperture of 0.4 or more and illuminated to a rotating optical recording medium and the intensity of reflected light from the recording medium is detected as an output intensity of a reproduced signal detector of the optical head. The reflectivity can be known by an output strength at a portion having a high reflectivity on the recording track, that is, in a space as long as possible between the recording bits. The output strength in the same location of a disk with only an aluminum reflection layer attached is defined as an output strength at a reflectivity of 85% and an proportional calculation is performed on the output so as to obtain a reflectivity of the medium to be measured. When the reading power is changed, the output also increases almost in proportion to the power, so that it is necessary to compensate for the increase so as to obtain a reflectivity.

(3) An optical recording medium described in Item (1) or (2) has a layer (a reflectivity adjustment layer) in which the optical constant is changed by illumination of light separately from a recording layer, and the reflectivity at a portion having a high reflectivity on the recording track is 60% or higher at the time of illumination of weak light, and the reflectivity at the same portion is 40% or lower at the time of illumination of strong light, and the reflectivity when information is read by a compact disk player, or a CD-ROM drive, or an optical video disk drive is more than 60%.

(4) In an optical recording medium described in Item (1) or (2), the reflectivity adjustment layer has a melting-point of 250° C. or more lower than that of the recording layer.

(5) In an optical recording medium described in Item (1) or (2), the melting-point of the reflectivity adjustment layer is 450° C. or lower.

(6) In an optical recording medium described in Item (1) or (2), 80% or more of the reflectivity adjustment layer comprises a metallic element having a melting-point of 450° C. or lower or at least two kinds of metals having a melting-point of 400° C. or lower.

(7) In an optical recording medium described in Item (1) or (2), the reflectivity adjustment layer has an eutectic alloy composition or a composition close to it.

(8) In an optical recording medium described in Item (7), the reflectivity adjustment layer has an eutectic alloy composition including a transition metal or a composition close to it. If the reflectivity adjustment layer has an eutectic alloy composition of a transition metal and a principal group metal (defined as a metal or semimetal other than transition metals) or a composition close to it, it is more desirable. An eutectic alloy composition of only transition metals or a composition close to it is desirable. If the reflectivity adjustment layer has an eutectic alloy composition including at least one of Au, Ag, and Al or a composition close to it, it is more desirable. Particularly when Au is included, it is desirable because a high reflectivity can be obtained easily. The adhesive property is low.

(9) In an optical recording medium described in Item (8), the reflectivity adjustment layer has a composition of one of alloys of Au—Sn, Au—Sb, Au—Ge, Au—Si, Au—In, Au—Ga, Ag—Sn, Ag—Ge, and Ag—In or mixed compositions of two or more of them or a composition close to them.

(10) In an optical recording medium described in Item (1) or (2), the reflectivity adjustment layer exists on the side opposite to the reflection layer taking the recording layer as a base.

(11) In an optical recording medium described in Item (1) or (2), the reflectivity adjustment layer exists between the recording layer and the reflection layer.

(12) In an optical recording medium described in Item (1) or (2), the reflectivity adjustment layer, the protective layer, the recording layer, the intermediate layer, and the reflection layer are laminated in this order from the substrate side directly on the substrate or via another layer.

(13) In an optical recording medium described in Item (1) or (2), at least one of the real part and the imaginary part of the complex refractive index of the reflectivity adjustment layer is changed by illumination of light by 20% or more of that before illumination.

(14) In an optical recording medium described in one of Items (1) to (6), at least one of the reflectivity adjustment layer and the recording layer includes a deposit comprising a high melting-point component which is relatively higher in the melting-point than the residual component of the thin layer.

In a conventional rewritable optical disk having a high reflectivity, the melting-point of the Au layer on the light incoming side is high, so that even at the laser power suited for overwriting information on the recording film, this layer will not be melted. Therefore, no high sensitivity can be obtained. Even if this Au layer is replaced with a low melting-point metal layer, the viscosity at the time of melting is often low. Therefore, when rewriting many times is repeated, flow and segregation of the film are generated little by little and the possible number of rewritings is small. However, according to the present invention, since the recording layer includes a deposit comprising a high melting-point component, many times of rewriting can be done.

(15) In an optical recording medium described in Item (14), the total amount of atoms of the high melting-point component is 3 to 50% with respect to the total number of atoms of constituent elements of said thin film. It is desirable that the atomic ratio is within a range from 5 to 40%.

(16) In an optical recording medium described in Item (14), a difference between the melting-point of the high melting-point component and the melting-point of the residual component of the thin film is 150° C. or higher.

(17) In an optical recording medium described in Item (14), the melting-point of the high melting-point component included in the reflectivity adjustment layer is 600° C. or higher.

(18) In an optical recording medium described in Item (14), the melting-point of the high melting-point component included in the recording layer is 800° C. or higher.

(19) In an optical recording medium described in Item (14), a deposit of the high melting-point component is distributed granularity or columnarly inside the thin film.

(20) In an optical recording medium described in Item (14), it is desirable that a deposit of the high melting-point component is smaller in size. The maximum external dimension of a deposit is within a range from 5 nm to 50 nm. A range from 10 nm to 30 nm is more desirable. The reason is that when the maximum external dimension is smaller than 5 nm, it is hard to generate a flow prevention effect, and when the maximum external dimension exceeds 50 nm, extremely great noise is generated, and when the maximum external dimension is smaller than 10 nm, the flow prevention effect is small, and when the maximum external dimension exceeds 30 nm, great noise is generated. (21) In an optical recording medium described in Item (19) or (20), when a columnar deposit of the high melting-point component is distributed in contact with the interfaces on both sides of the thin film, for example, a deposit is grown columnarly from the interfaces on both sides, the length (height) of the deposit in the direction of film thickness is longer than 5 nm and shorter than a half of the thickness of the thin film. It is more desirable that the length is within a range from 10 nm to a half of the thickness of the thin film. The reason is that when the length is shorter than 5 nm, it is hard to generate a flow prevention effect and when the length is shorter than 10 nm, the flow prevention effect is slightly small.

(22) In an optical recording medium described in Item (19) or (20), when a columnar deposit of the high melting-point component is distributed in contact with the interface on one side of the thin film, for example, a deposit is grown columnarly from the interface on one side or distributed only inside the thin film not in contact with the interfaces on both sides of the thin film, the length (height) of the deposit in the direction of film thickness is within a range from 10 nm to the thickness of the thin film. It is more desirable that the length is within a range from 20 nm to the thickness of the thin film. The reason is that when the length is shorter than 10 nm, it is hard to generate a flow prevention effect and when the length is shorter than 20 nm, the flow prevention effect is slightly small.

(23) In an optical recording medium having a reflectivity adjustment layer described in Items (19) to (22), the length of a straight line connecting the centers of two neighboring granular or columnar deposits which passes through the portion between the deposits in the direction of the surface of the thin film, that is, the area of the residual component of the thin film is within a range from 15 nm to 70 nm. A range from 20 nm to 60 nm is more desirable. The reason is that when the length is shorter than 15 nm, the carrier-to-noise ratio (C/N) decreases and when the length exceeds 70 nm, the possible number of rewritings decreases. When the length is shorter than 20 nm, the C/N ratio decreases slightly and when the length exceeds 60 nm, the possible number of rewritings decreases slightly and the use is limited.

(24) In an optical recording medium described in Item (14), a deposit of the high melting-point component included in at least one of the reflectivity adjustment layer and the recording layer is porous and the residual component is distributed in holes of the porous deposit.

(25) In an optical recording medium described in Item (14), when the high melting-point component is deposited as a porous deposit, the maximum dimension of holes of the porous deposit of the high melting-point component in the direction of the surface of the thin film is 80 nm or smaller and the wall thickness of the area between the two neighboring holes in the direction of the surface of the thin film is 20 nm or thinner. A porous hole may be partially connected with the neighboring hole thereof.

(26) In an optical recording medium described in Item (14), when the mean composition of the reflectivity adjustment layer is expressed by the formula:

$$L_j H_k \quad (1)$$

using a low melting-point component L of an individual element, a compound, or a mixed composition and a high melting-point component H of an individual element or a compound composition, the content of each element in the film is within a range of the value decided by the above formula ±10 atomic % on condition that a composition of the above formula, where $0.2 \leq k/(j+k) \leq 0.4$, is a reference composition. It is more desirable that the content is within a range of ±5 atomic %.

(27) In an optical recording medium described in Item (14), both the low melting-point component and the high melting-point component of the reflectivity adjustment layer include 50 atomic % or more of a metal element or a semimetal element respectively.

(28) In an optical recording medium described in Item (14), the high melting-point component to be added to the reflectivity adjustment layer is a compound with at least one selected from a group of a transition metal, Sn, and Pb.

(29) In an optical recording medium described in one of Items (14) and (17), the melting-point of the residual component of the reflectivity adjustment layer is 450° C. or lower.

(30) In an optical recording medium described in Item (14), it is desirable that the residual component of the reflectivity adjustment layer is an alloy of at least one element selected from a group of Au and Ag and at least one element selected from a group of Sn, Ge, Si, In, and Ga. In addition to it, at least one alloy selected from a group of Al—Au, Al—Ag, and Al—Cu may be used.

(31) In an optical recording medium described in one of Items (1), (2), and (14), the main components of the recording layer are comprised of Ge and Te or comprised of Se and at least one element selected from a group of In and Sb.

(32) In an optical recording medium described in Item (14), when the mean composition of the recording layer is expressed by the formula:

$$L_j H_k \quad (2)$$

using a low melting-point component L of an individual element, a compound, or a mixed composition and a high melting-point component H of an individual element or a compound composition, the content of each element in the film is within a range of the value decided by the above formula ±10 atomic % on condition that a composition of the above formula, where $0.2 \leq k/(j+k) \leq 0.4$, is a reference composition. It is more desirable that the content is within a range of ±5 atomic %.

For example, when the reference composition of the recording layer is $(GeSb_2Te_4)_{80}(Cr_4Te_5)_{20}$, a symbol L of Formula (2) indicates $GeSb_2Te_4$, and H indicates $Cr_4Te_5$, and $k/(j+k)$ is 0.2. As to atomic % of each element, it is 11% for Ge of L, 23% for Sb of L, and 46% for Te of L and 9% for Cr of H and 11% for Te of H. Therefore, as to the range of the value decided by Formula (2) ±10 atomic %, it is 1 to 21% for Ge of L, 13 to 33% for Sb of L, and 36 to 56% for Te of L and 0 to 19% for Cr of H and 1 to 21% for Te of H.

(33) In an optical recording medium described in Item (14), the high melting-point component included in the recording layer is a compound of Te and at least one element selected from a group of Cr and Ag.

(34) In an optical recording medium described in one of Items (14) and (16), the melting-point of the residual component (phase-change component) of the recording layer is 750° C. or lower.

It is desirable that the mean composition of the reflectivity adjustment layer is expressed by the following general formula (3).

$$A_eB_fC_g \quad (3)$$

The above symbol A indicates at least one element selected from Sn, Pb, Bi, Zn, Ga, and In, and the above symbol B indicates at least one element selected from a group of As, B, C, N, 0, S, Se, Si, Te, Ag, Al, Au, Ba, Be, Ca, Cd, Co, Cr, Cs, Cu, Fe, Ge, Hf, Hg, Ir, K, Li, Mg, Mn, Mo, Na, Nb, Ni, Os, Pd, Pt, Rb, Re, Rh, Ru, Sb, Sc, Sr, Ta, Ti, V, W, Y, and Zr, and the above symbol C indicates at least one element other than the elements indicated by A and B, for example, Tl, Br, Cl, F, H, I, or P. The units of the above symbols e, f, and g are atomic % respectively and it is desirable that $30 \leq e \leq 95$, $5 \leq f \leq 50$, and $0 \leq g \leq 20$. It is more desirable that $40 \leq e \leq 87$, $13 \leq f \leq 40$, and $0 \leq g \leq 10$.

When the elements indicated by A and B are Sn and Au respectively, for example, the element indicated by C may be elements other than Sn and Au. In a combination of A, A' (when A indicates two elements A and A' such as Sn and Zn), B, and C, it is desirable that a high melting-point component produced from a combination of A-B, B-C, and A'-B has no eutectic point or that even when having an eutectic point, the melting-point is higher than the melting-point of each of A and A-A' by 150° C. or more.

It is desirable that the mean composition of a reflectivity adjustment layer including a high melting-point component is at least one of Au—Sn—Ti, Au—Ge—Ti, Au—Si—Ti, Au—Sb—Ti, Au—In—Ti, Au—Ga—Ti, Ag—Sn—Ti, Ag—Ge—Ti, Ag—In—Ti, Ag—Ga—Ti, Au—Sn—Pt, Au—Si—Pt, Au—In—Pt, Au—Ga—Pt, Ag—Sn—Pt, Ag—In—Pd, Ag—Ga—Pd, Pb—Se, Pb—Ce, Pb—La, Pb—Pt, Pb—Si, Sn—Sb, Sn—Se, Sn—Co, Sn—Cu, Sn—Ni, Sn—Pt, Bi—Te, Bi—Se, Bi—Ce, Bi—Cu, Bi—Cd, Bi—Pt, Zn—Ni, Zn—Pt, Zn—La, Zn—Ce, Ga—Cr, Ga—Cu, Ga—Ni, Ga—La, Ga—Pt, Ga—Ce, In—Se, In—Sb, In—Te, In—As, In—Mn, In—Ni, In—Ag, Pb—Sn—Se, Pb—Sn—Ce, Pb—Sn—La, Pb—Sn—Pt, Pb—Sn—Si, Pb—Sn—Sb, Pb—Sn—Co, Pb—Sn—Cu, Pb—Sn—Ni, Sn—Bi—Sb, Sn—Bi—Se, Sn—Bi—Co, Sn—Bi—Cu, Sn—Bi—Ni, Sn—Bi—Pt, Sn—Bi—Te, Sn—Bi—Ce, Sn—Bi—Cd, Zn—Sn—Sb, Zn—Sn—Se, Zn—Sn—Co, Zn—Sn—Cu, Zn—Sn—Ni, Zn—Sn—Pt, Zn—Sn—Ni, Zn—Sn—La, Zn—Sn—Ce, Sn—Ga—Sb, Sn—Ga—Se, Sn—Ga—Co, Sb—Ga—Cu, Sn—Ga—Ni, Sn—Ga—Pt, Sn—Ga—Cr, Sn—Ga—La, Sn—Ga—Ce, Bi—Ga—Te, Bi—Ga—Se, Bi—Ga—Cu, Bi—Ga—Cd, Bi—Ga—Pt, Bi—Ga—Cr, Bi—Ga—Ni, Bi—Ga—La, Bi—Ga—Ce, In—Ga—Cr, In—Ga—Cu, In—Ga—Ni, In—Ga—La, In—Ga—Pt, In—Ga—Ce, In—Ga—Se, In—Ga—Sb, In—Ga—Te, In—Ga—As, In—Ga—Mn, In—Ga—Ag, In—Bi—Te, In—Bi—Se, In—Bi—Cu, In—Bi—Cd, In—Bi—Pt, In—Bi—Sb, In—Bi—As, In—Bi—Mn, In—Bi—Ni, In—Bi—Ag, and In—Bi—Ce. Among them, at least one of Au—Sn—Ti, Au—Ge—Ti, Au—Si—Ti, Au—Sb—Ti, Au—In—Ti, Au—Ga—Ti, Ag—Sn—Ti, Ag—Ge—Ti, Ag—In—Ti, Ag—Ga—Ti, Au—Sn—Pt, Au—Si—Pt, Au—In—Pt, Au—Ga—Pt, Ag—Sn—Pt, Ag—In—Pd and Ag—Ga—Pb is particularly desirable.

A recording layer having a mean composition such as expressed by the following general formula (4) may be used.

$$Se_pM_qN_rO_s \quad (4)$$

The above symbol M indicates at least one element selected from In, Sb, Bi, Te, Au, B, Cs, Sn, Tl, S, Ge, Fe, and Zn, and the above symbol N indicates at least one element of As, C, N, 0, Si, Ag, Al, Ba, Be, Ca, Cd, Co, Cr, Cu, Hf, Hg, Ir, K, Li, Mg, Mn, Mo, Na, Nb, Ni, Os, Pd, Pt, Rb, Re, Rh, Ru, Sc, Sr, Ta, Ti, V, W, Y, Zr, Pb, Ga, U and Se, and the elements other than the element indicated by M. The above symbol O indicates at least one element other than Se and the elements indicated by M and N, for example, Br, Cl, F, H, I, or P. The units of the above symbols p, q, r, and s are atomic % respectively. It is desirable that $40 \leq p \leq 95$, $0 \leq q \leq 55$, $5 \leq r \leq 50$, and $0 \leq s \leq 20$ and more desirable that $50 \leq p \leq 80$, $0 \leq q \leq 40$, $10 \leq r \leq 40$, and $0 \leq s \leq 10$.

The composition of Formula (4) can be used for a phase change recording film of a recording medium using no reflectivity adjustment layer and also for a phase-change recording film when a reflectivity adjustment layer is replaced with a high melting-point metal layer such as Au. If this recording film is used, a medium in which there is a great difference in reflectivity between the crystalline state and the amorphous state can be produced.

It is desirable that the low melting-point (phase-change) component and the high melting-point component of the reflectivity adjustment layer include 50 atomic % or more of a metal element or a semimetal element respectively and more desirable that they include 65atomic % or more.

In a combination of a high melting-point component and a low melting-point component, it is desirable that the same element exists within a range from 30 atomic % to 80 atomic % in each component.

It is desirable that the mean composition of a phase-change component of a recording film is at least one of the compositions of the group D indicated below, or a composition close to it, or a compound or a mixture having a melting-point between 500° C. and 750° C.

<Group D>

Sn, Pb, Sb, Te, Zn, Cd, Se, In, Ga, S, Tl, Mg, Tl$_2$Se, TlSe, Tl$_2$Se$_3$, Tl$_3$Te$_2$, TlTe, InBi, In$_2$Bi, TeBi, Tl—Se, Tl—Te, Pb—Sn, Bi—Sn, Se—Te, S—Se, Bi—Ga, Sn—Zn, Ga—Sn, Ga—In, In$_3$SeTe$_2$, AgInTe$_2$, GeSb$_4$Te$_7$, GeSb$_2$Te$_4$, Ge$_2$Sb$_2$Te$_5$, GeTe, GeBi$_4$Te$_7$, GeBi$_2$Te$_4$, Ge$_3$Bi$_2$Te$_6$, Sn$_2$Sb$_6$Se$_{11}$, Sn$_2$Sb$_2$Se$_5$, SnSb$_2$Te$_4$, Pb$_2$Sb$_6$Te$_{11}$, CuAsSe$_2$, Cu$_3$AsSe$_3$, CuSbS$_2$, CuSbSe$_2$, InSe, Sb$_2$Se$_3$, Sb$_2$Te$_3$, Bi$_2$Te$_3$, SnSb, FeTe, Fe$_2$Te$_3$, FeTe$_2$, ZnSb, Zn$_3$Sb$_2$, VTe$_2$, V$_5$Te$_8$, AgIn$_2$, BiSe, InSb, In$_2$Te, In$_2$Te$_5$, Ba$_4$Tl, Cd$_{11}$Nd, Ba$_{13}$Tl, Cd$_6$Nd, Ba$_2$Tl.

Among them, it is particularly desirable that a recording film has a main component of GeTe and desirable that it has a main component of Ge$_2$Sb$_2$Te$_5$.

It is desirable that the mean composition of the phase-change component of the reflectivity adjustment layer is at least one of the compositions of the group E indicated below, or a composition close to it, or an alloy, a mixture, or a compound having a melting-point of 450° C. or lower.

<Group E>

Au$_{70}$Sn$_{30}$, Au$_{75}$Ge$_{25}$, Au—Sb, Au$_{80}$Si$_{20}$, Au$_{65}$Ga$_{35}$, Au—In, Ag—Sn, Ag—In, Ag—Ga, Al$_{70}$Ge$_{30}$, Ag—Ge, Sn, Pb, Te, Zn, Cd, Se, In, Ga, S, Tl, Tl$_2$Se, TlSe, Tl$_2$Se$_3$, Tl$_3$Te$_2$, TlTe, InBi, In$_2$Bi, TeBi, Tl—Se, Tl—Te, Pb—Sn, Bi—Sn, Se—Te, S—Se, Bi—Ga, Sn—Zn, Ga—Sn, Ga—In, Ba$_4$Tl.

Among them, at least one of Au$_{70}$Sn$_{30}$, Au$_{75}$Ge$_{25}$, Au—Sb, Au$_{80}$Si$_{20}$, Au$_{65}$Ga$_{35}$, Au—In, Ag—Sn, Ag—In, and Ag—Ga or a composition close to it is particularly desirable.

It is more desirable that the mean composition of the phase-change component of the reflectivity adjustment layer is at least one of the compositions of the group F indicated below, or a composition close to it, or an alloy, a mixture, or a compound having a melting-point of 250° C. or lower.

<Group F>

Sn, Se, In, Ga, S, InBi, In$_2$Bi, TeBi, Tl—Se, Tl—Te, Pb—Sn, Bi—Sn, Se—Te, S—Se, Bi—Ga, Sn—Zn, Ga—Sn, Ga—In

The mean composition of a high melting-point component when at least one of the compositions of the group D is used as a phase-change of the recording layer or when a high melting-point component is included in the reflectivity adjustment layer may be at least one of the compositions of the group G indicated below, or a composition close to it, or a compound having a melting-point of 800° C. or higher. A "composition close to it" mentioned above indicates a composition whose variation from the listed compositions is within a range of ±10 atomic % (the same may said with the following). For example, in the case of BaPd2, as to the atomic % of each element, it is 33% for Ba and 67% for Pd. Therefore, as to a range of ±10 atomic % of a variation from the composition BaPd2, it is 23 to 43% for Ba and 57 to 77% for Pd.

<Group G>

$BaPd_2$, $BaPd_5$, $NdPd$, $NdPd_3$, $NdPd_5$, $Nd_7Pt_3$, $Nd_3Pt_2$, $NdPt$, $Nd_3Pt_4$, $NdPt_2$, $NdPt_5$, $Bi_2Nd$, $BiNd$, $Bi_3Nd_4$, $Bi_3Nd_5$, $BiNd_2$, $Cd_2Nd$, $CdNd$, $Mn_2Nd$, $Mn_{23}Nd_6$, $Mn_{12}Nd$, $Nd_5Sb_3$, $Nd_4Sb_3$, $NdSb$, $NdSb_2$, $Fe_2Nd$, $Fe_{17}Nd_2$, $Cs_3Ge_2$, $CsGe$, $CsGe_4$, $Nd_5Si_3$, $Nd_5Si_4$, $NdSi$, $Nd_3Si_4$, $Nd_2Si_3$, $Nd_5Si_9$, $Cs_2Te$, $NdTe_3$, $Nd_2Te_5$, $NdTe_2$, $Nd_4Te_7$, $Nd_2Te_3$, $Nd_3Te_4$, $NdTe$, $Ce_3Ir$, $Ce_2Ir$, $Ce_{55}Ir_{45}$, $CeIr_2$, $CeIr_3$, $Ce_2Ir_7$, $CeIr_5$, $CaPd$, $CaPd_2$, $CaGe$, $Ca_2Ge$, $GeNa_3$, $GeNa$, $CaSi_2$, $Ca_2Si$, $CaSi$, $Se_2Sr$, $Se_3Sr_2$, $SeSr$, $GeSr_2$, $GeSr$, $Ge_2Sr$, $SnSr$, $Sn_3Sr_5$, $SnSr_2$, $Ce_2Tl$, $Ce_5Tl_3$, $CeTl_3$, $Ce_3Tl_5$, $CeTl$, $BaTl$, $Pd_{13}Tl_9$, $Pd_2Tl$, $Pd_3Tl$, $Mg_2Si$, $Mg_2Ge$, $BaPd_2$, $BaPd_5$, $Ce_4Se_7$, $Ce_3Se_4$, $Ce_2Se_3$, $CeSe$, $Ce_5Ge_3$, $Ce_4Ge_3$, $Ce_5Ge_4$, $CeGe$, $Ce_3Ge_5$, $Ce_5Si_3$, $Ce_3Si_2$, $Ce_5Si_4$, $CeSi$, $Ce_3Si_5$, $CeSi_2$, $CeTe_3$, $Ce_2Te_5$, $CeTe_2$, $Ce_4Te_7$, $Ce_3Te_4$, $CeTe$, $La_3Se_7$, $LaSe_2$, $La_4Se_7$, $La_2Se_3$, $La_3Se_4$, $LaSe$, $GeLa_3$, $Ge_3La_5$, $Ge_3La_4$, $Ge_4La_5$, $GeLa$, $Ge_5La_3$, $BaSe_2$, $Ba_2Se_3$, $BaSe$, $PdSe$, $Mo_3Se_4$, $MoSe_2$, $Ba_2Ge$, $BaGe_2$, $BaGe$, $Ba_2Te_3$, $BaTe$, $Ge_2Pd_5$, $GePd_2$, $Ge_9Pd_{25}$, $GePd$, $Ge_3Pt$, $Ge_3Pt_2$, $GePt$, $Ge_2Pt_3$, $GePt_2$, $GePt_3$, $Pu_3Sn$, $Pu_5Sn_3$, $Pu_5Sn_4$, $Pu_8Sn_7$, $Pu_7Sn_8$, $PuSn_2$, $PuSn_3$, $Pt_5Te_4$, $Pt_4Te_5$, $PtTe_2$, $GeNi$, $Ge_3Ni_5$, $Ge_2Ni_5$, $GeNi_3$, $NiTe_{0.85}$, $NiTe_{0.775}$, $Ni_3\pm_xTe_x$, $Cr_{11}Ge_{19}$, $CrGe$, $Cr_{11}Ge_8$, $Cr_5Ge_3$, $Cr_3Ge$, $CrSi_2$, $Cr_5Si_3$, $Cr_3Si$, $Cr_5Te_8$, $Cr_4Te_5$, $Cr_3Te_4$, $Cr_{1-x}Te$, $Ge_3Mn_5$, $GeMn_2$, $Mn_6Si$, $Mn_9Si_2$, $Mn_3Si$, $Mn_5Si_2$, $Mn_5Si_3$, $MnSi$, $Mn_{11}Si_{19}$, $Mn_2Sn$, $Mn_{3.25}Sn$, $MnTe$, $Te_2W$, $FeGe_2$, $Fe_5Ge_3$, $Fe_3Ge$, $Fe_2Si$, $Fe_5Si_3$, $FeSi$, $FeSi_2$, $Ge_2Mo$, $Ge_{41}Mo_{23}$, $Ge_{16}Mo_9$, $Ge_{23}Mo_{13}$, $Ge_3Mo_5$, $GeMo_3$, $Mo_3Si$, $Mo_5Si_3$, $MoSi_2$, $MoSn$, $MoSn_2$, $Mo_3Te_4$, $MoTe_2$, $Si_2Ti$, $SiTi$, $Si_4Ti_5$, $Si_3Ti_5$, $SiTi_3$, $Sn_5Ti_6$, $Sn_3Ti_5$, $SnTi_2$, $SnTi_3$, $CoGe_2$, $Co_5Ge_7$, $CoGe$, $Co_5Ge_3$, $Co_4Ge$, $Co_3Te_4$, $Ge_7Re_3$, $Re_5Si_3$, $ReSi$, $ReSi_2$, $Re_2Te$.

The mean composition of a high melting-point component when at least one of the compositions of the group E is used as a phase-change of the reflectivity adjustment layer may be at least one of the compounds of the group G indicated above and the group H indicated below, or a composition close to it, or an alloy, a mixture, or a compound having a melting-point of 600° C. or higher.

<Group H>

$Cs_3Ge$, $Ba_2Tl$, $GePd_3$, $Fe_6Ge_5$, $FeTe_2$, $Co_5Ge_2$, $Nd_3Pd$, $Cs_3Te_2$, $Ce_4Ir$, $NaPd$, $Ca_9Pd$, $Ca_3Pd_2$, $Ca_2Ge$, $Se_3Sr$, $Ce_3Tl$, $CeSe_2$, $Ce_3Ge$, $BaSe_3$, $GeSe_2$, $GeSe$, $BaTe_2$, $GePd_5$, $Ge_8Mn_{11}$, $MnTe_2$, $Ge_3W_2$, $FeGe$, $Fe_4Ge_3$, $Fe_3Sn$, $Fe_3Sn_2$, $FeSn$, $CoTe_2$.

The mean composition of a high melting-point component when at least one of the compositions of the group F is used as a phase-change of the reflectivity adjustment layer may be at least one of the compounds of the group H indicated above and the group I indicated below, or a composition close to it, or an alloy, a mixture, or a compound having a melting-point of 400° C. or higher.

<Group I>

$Ba_4Tl$, $CsTe$, $Ba_4Tl$, $Ba_{13}Tl$, $Cd_{11}Nd$, $Cd_6Nd$, $Cs_5Te_4$, $Ca_3Pd$, $Ca_5Pd_2$, $Sn_3Sr$, $Ba_{13}Tl$, $PdTl_2$, $FeSe_2$, $FeSe$, $Cr_2Te_3$, $CrTe_3$, $FeSn_2$.

The composition or film thickness of the reflectivity adjustment layer may be the same in the inner and outer diameter zones. However, it is desirable that it is different between the inner and outer portions and the peripheral portion of track of the reflectivity adjustment layer is also crystallized.

A satisfactory characteristic is obtained when the thickness of a reflectivity adjustment layer is within a range from 8 nm to 50 nm. When the thickness is 8 nm or thinner, a reflectivity of 60% cannot be obtained and when it is 50 nm or thicker, the reproduced signal modulation degree is decreased. When the thickness of a reflectivity adjustment layer is within a range from 10 nm to 20 nm, a particularly satisfactory characteristic is obtained.

A "main component" described in the present invention indicates that the corresponding substance is included at a rate of 60% or more, more desirably 80% or more, of the total number of constituent atoms with respect to the total number of atoms. For example, for the composition of $Ge_{40}Te_{45}Se_{15}$, GeTe can be considered as a main component because the composition is the same as $Ge_{40}Te_{40}+Te_5Se_{15}$.

The aforementioned recording medium of the present invention is similar in the laminating structure to the recording medium described in Japanese Patent Application Laid-Open 573961 mentioned above. The reason is that the low melting-point metal layer has a function for adjusting the reflectivity as in the present invention. However, in the disk described in Japanese Patent Application Laid-Open 5-73961, the reflectivity at a high temperature portion is increased, so that the recording power cannot be reduced.

In an information processor of the present invention, or an information reading method, or an optical recording medium to be used for them.

(35) An information processing apparatus comprises at least an optical head for illuminating a laser beam to the recording medium and detecting the reflected light, a reproduced signal processing means, an address reading means, a recording data modulation means, a laser power control data analysis means, a peak (recording) power deciding means, a power ratio deciding means, a record and erase current amplifying means, a read power deciding means, a read current amplifying means, and a laser driver and the power ratio deciding means has a function for setting the power ratio of the recording power level to the erase power level at a value less than 2 to 1 when information is rewritten by overwriting.

(36) In an optical recording medium described in Item (1) or (2), when information is rewritten by overwriting, the information for setting the power ratio of the recording power level to the erase power level at a value less than 2 to 1 is written on the optical recording medium (for example, the control zone).

(37) An information processing apparatus comprises at least an optical head for illuminating a laser beam to the recording medium and detecting the reflected light, a reproduced signal processing means, an address reading means, a recording data modulation means, a laser power control data analysis means, a peak power deciding means, a record current amplifying means, a read power deciding means, a read current amplifying means, and a laser driver and the peak power deciding means has a function of setting the laser power so that the reflectivity of the optical recording medium becomes a low value in at least a part of the rewriting time when information is rewritten.

(38) An information processing apparatus comprises at least an optical head for illuminating a laser beam to the recording medium and detecting the reflected light, a reproduced signal processing means, an address reading means, a recording data modulation means, a laser power control data analysis means, a peak power deciding means, a power ratio deciding means, a record and erase current amplifying means, a read power deciding means, a read current amplifying means, and a laser driver and the peak power deciding means and the power ratio deciding means have a function of setting the laser power so that the reflectivity of the optical recording medium becomes a low value in at least a part of the rewriting time when information is rewritten.

(39) In an optical recording medium described in Item (1) or (2), the recording medium has a property that when a high power laser beam is illuminated, the reflectivity reduces greatly and when the power of the laser beam is lowered, the reflectivity returns to a high value, and the information for setting the laser power so that the optical constant of the reflectivity adjustment layer of the optical recording medium changes greatly in at least a part of the rewriting time when the information is rewritten is written on the optical recording medium (for example, the control zone).

(40) An information processing apparatus comprises at least an optical recording medium having a property that the reflectivity changes greatly at the predetermined laser power, an optical head for illuminating a laser beam to the recording medium and detecting the reflected light, a reproduced signal processing means, an address reading means, a recording data modulation means, a laser power control data analysis means, a peak power deciding means, a record current amplifying means, a read power deciding means, a read current amplifying means, and a laser driver and the peak power deciding means has a function for setting the output of the laser beam for recording to an output at which the whole film is not melted in any area of the reflectivity adjustment layer of the optical recording layer.

(41) In an optical recording medium described in Item (1) or (2), the information for setting the output of the laser beam to an output at which the whole film is not melted even in the area of the reflectivity adjustment layer of the optical recording medium where the temperature is highest is written on the optical recording medium (for example, the control zone).

(42) An information processing apparatus comprises at least an optical head for illuminating a laser beam to the recording medium and detecting the reflected light, a reproduced signal processing means, an address reading means, a read power deciding means, and a read current amplifying means and (when information is read from an optical recording medium having a particularly high recording density,) the read power deciding means has a function of setting the read laser power at an intermediate value between the laser power at which the information recorded on the optical recording medium changes while a laser beam spot passes on the optical recording medium once and the lowest laser power down to which the reflectivity of the optical recording medium changes to a low value.

(43) An optical recording medium has a property that when a high-power laser beam is illuminated, the reflectivity reduces greatly and when the power of the laser beam is lowered, the reflectivity returns to a high value and the information for setting the read laser power to an intermediate value between the laser power at which the information recorded on the optical recording medium is changed while a laser beam spot passes on the optical recording medium once and the lowest laser power at which the reflectivity of the optical recording medium is changed to a low value is written on the optical recording medium (for example, the control zone).

(44) An information processing apparatus comprises at least an optical head for illuminating a laser beam to the recording medium and detecting the reflected light, a reproduced signal processing means, an address reading means, a read power deciding means, and a read current amplifying means and the read power deciding means has a function for setting the read laser power to a value lower than the lowest laser power at which the reflectivity of the optical recording medium is changed to a low value.

(45) An optical recording medium has a property that when a high-power laser beam is illuminated, the reflectivity reduces greatly and when the power of the laser beam is lowered, the reflectivity returns to a high value and the information for setting the read laser power at a value lower than the lowest laser power down to which the reflectivity of the optical recording medium changes to a low value is written on the optical recording medium (for example, the control zone).

(46) An information reading method reads information recorded on an optical recording medium in which the reflectivity at the time of illumination of weak light is high and the reflectivity at the same portion at the time of illumination of strong light is low, using an apparatus reading information from a compact disk, a CD-ROM disk, or an optical video disk.

(47) An information reading method reads information recorded on an optical recording medium in which the reflectivity at a portion having a high reflectivity on the recording track is 60% or higher at the time of illumination of weak light and the reflectivity at the same portion is 40% or lower at the time of illumination of strong light, using an apparatus reading information from a compact disk, a CD-ROM disk, or an optical video disk.

(48) An information processing apparatus comprises at least a recording medium having a property that when a high-power laser beam is illuminated, the reflectivity reduces greatly and when the power of the laser beam is lowered, the reflectivity returns to a high value, an optical head for illuminating a laser beam to the recording medium and detecting the reflected light, a reproduced signal processing means, an address reading means, a recording data modulation means, a laser power control data analysis means, a peak power deciding means, a record current amplifying means, a read power deciding means, a read current amplifying means, a laser driver, a test-writing zone reading means, and a test writing controller, and the test-writing controller has at least a function for performing test-writing at the time of replacement of a recording medium, and the test-writing zone reading means has a function for reading the test-writing result and sending the information to the peak power deciding means.

(49) An optical recording medium has a property that when a high-power laser beam is illuminated, the reflectivity reduces greatly and when the power of the laser beam is lowered, the reflectivity returns to a high value and includes a test-writing zone partially.

(50) An information processing apparatus comprises at least a recording medium having a property that when a high-power laser beam is illuminated, the reflectivity adjustment layer melts and the reflectivity reduces greatly and when the power of the laser beam is lowered, the reflectivity returns to a high value, an optical head for illuminating a laser beam to the recording medium and detecting the reflected light, a reproduced signal processing means, an address reading means, a recording data modulation means, a pulse-width correcting means, a laser power control data analysis means, a peak power deciding means, a record current amplifying means, a read power deciding means, a read current amplifying means, and a laser driver and the pulse-width correcting means has a function of preventing the written mark length from becoming longer than the original length thereof due to a change in the melting area of the reflectivity adjustment layer by narrowing the pulse width.

According to the present invention, the wave length of a laser beam for recording and reading is generally within a range from 780 nm to 830 nm. However, any wave length beyond the range may be used if necessary. A wave length of 780 nm is particularly desirable because the laser beam spot becomes small.

In the information recording medium of the present invention, when a high-power laser beam is illuminated at the time of recording (overwriting), at least one of the real part (refractive index n) and the imaginary part (extinction coefficient k) of the complex refractive index at the high-temperature portion in the laser beam spot is changed from that before illumination, so that the reflectivity in the high temperature portion in the laser beam spot is reduced. As a result, data can be recorded at a low laser power. When a particularly desirable change occurs in the refractive index, the light absorptivity in the area (for example, the crystalline area) having a high reflectivity becomes larger than the light absorptivity in the area (for example, the amorphous area) having a low reflectivity. By doing this, when data is rewritten by overwriting, a distortion in the shape of a written mark newly formed which is caused by that the temperature at the location where an amorphous written mark exists previously becomes higher than the temperature at the other locations can be prevented. When a secondarily desirable change occurs in the refractive index, the light absorptivities in both areas become equal to each other. In this case, the temperature in the amorphous area is a little higher than that in the crystalline area because the thermal conductivity in the crystalline area is higher than that in the amorphous area.

In the reflectivity adjustment layer and the recording layer of the present invention, although the possible number of rewritings decreases even if at least one of them does not include a high melting-point component, the aforementioned operation can be realized and the layers can be put into practical use depending on the use.

When a high melting-point component having a melting-point which is relatively higher than that of the phase-change component is deposited, the flow and segregation when the film is melted by illumination of a laser beam are prevented effectively. As a result, data can be rewritten more times than conventional with the satisfactory characteristic kept. As shown, in FIG. 1, the light absorbing area indicated by 2b in the laser beam spot in which the reflectivity adjustment layer is melted and the reflectivity is reduced is a part of the laser beam spot, so that the temperature rising area of the recording layer is reduced, and a fine written mark is formed reproducibly, and data can be recorded easily in high density.

Assuming that the mean composition of the reflectivity adjustment layer is expressed by the aforementioned general formula (3), the element indicated by A in the formula is melted at a low temperature, so that the reflectivity can be changed at a low temperature. When the element indicated by B coexists, a compound of A and B, or the element B, dr a compound of elements B becomes a high melting-point component and has an effect for preventing the flow and segregation when the reflectivity adjustment layer is melted. When, for example, Tl coexists as C in Formula (3), the value of C/N can be increased.

The reflectivity adjustment layer of the present invention increases the light absorption only in a part of the laser beam spot, so that it has an operation and an effect for forming a fine written mark and facilitating recording in high density. This operation and effect are valid even if a normal rewritable phase-change disk in which the thickness of any layer is changed and the reflectivity at the time of illumination of weak light is less than 60% is used. Particularly, they are valid when the recording sensitivity is apt to reduce such as when a light reflection layer is made of Si having a low light absorptivity.

The material of a recording film may be an organic or photo electromagnetic material.

According to the present invention, enlargement or reduction of the melted area of the reflectivity adjustment layer operates synergetically for increasing or decreasing of the laser beam power, so that the temperature of the recording film rises or lowers steeply and it is desirable to obtain a reproduced signal faithful to a recorded signal.

DETAILED DESCRIPTION OF THE PREFERRED EMBODIMENTS

Embodiment 1

Figure 2:
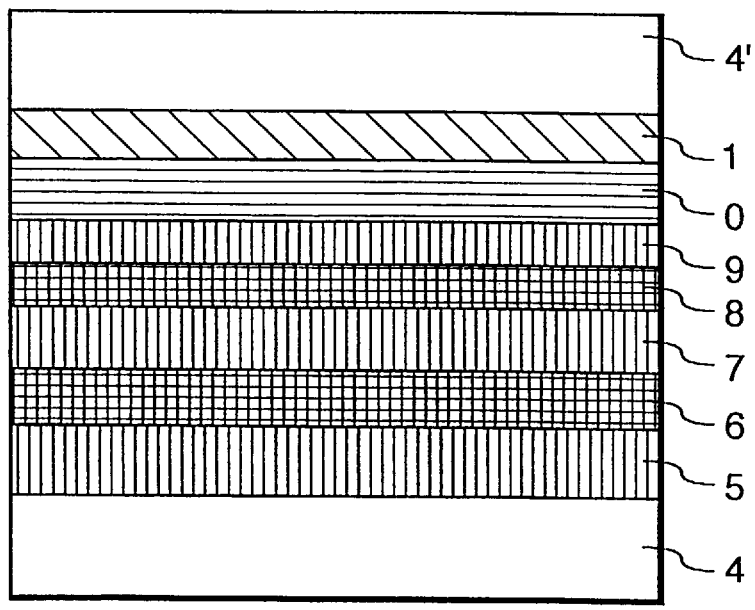
FIG. 2 is a drawing showing an example of the cross sectional structure of a disk of the present invention.

FIG. 2 shows an example of the cross sectional diagram of the structure of a read/write disk using a reflectivity adjustment layer of the present invention. In this embodiment, a polycarbonate substrate 4 having an uneven surface with a diameter of 13 cm and a thickness of 1.2 mm is molded by the injection molding method first. The substrate surface has a helical recording track with a track pitch of about 1.6 $\mu$m and about 20000 tracks on the assumption that one round of the disk has one track. Each track has at least a preformatted portion at a location. In the preformatted portion, an address or a synchronizing signal is expressed by a pit. In the signal recording portion other than the preformatted portion, a tracking groove is formed. Next, the substrate is attached in the magnetron sputtering apparatus which has a plurality of targets, can form laminated films sequentially, and realizes uniformity and reproducibility of the film thickness, and a $SiO_2$ layer 5 with a thickness of 100 nm is formed on it. Then, an $(Au_{70}Sn_{30})_{80}(SnTi_2)_{20}$ film which is a reflectivity adjustment layer, that is, an $Au_{56}Sn_{31}Ti_{13}$ film 6 with a thickness of 15 nm, a $(ZnS)_{80}(SiO_2)_{20}$ layer 7 with a thickness of 20 nm which is a protective dielectric layer, and a $(Cr_4Te_5)_{20}(Ge_{46}Te_{46}Se_8)_{80}$ film 8 with a thickness of 20 nm which is a recording film are formed. Next, a $(ZnS)_{80}(SiO_2)_{20}$ layer 9 with a thickness of 40 nm which is an intermediate layer and an Au layer 10 with a thickness of 100 nm which is a light reflection layer are laminated sequentially. Thereafter, a polycarbonate substrate 4' is adhered on it via an adhesion layer 11. Only one side of this disk can be used. However, two disks having the same structure from 4 to 10 may be prepared and adhered to each other with an adhesion layer 11 so as to form a double side structure. A protective inorganic dielectric layer may be added onto the light reflection layer or an ultraviolet curing resin protective layer may be provided. The subsequent adhesion is the same as above.

The intermediate layer functions so as to prevent mutual diffusion between the recording layer and the reflection layer and to increase the recording sensitivity by reducing transfer of heat toward the reflection layer.

It is desirable that at least one of the interfaces is protected by another adhered material and more desirable that both side interfaces are protected. The same may be said with the reflectivity adjustment layer. This protection may be carried out by the substrate. However, it is desirable that a protective layer formed separately from the substrate is used because the protection effect can be increased. Formation of a "protective layer" can prevent an increase in noise caused by deformation of the thin film during recording. The $(ZnS)_{80}(SiO_2)_{20}$ layer 5 and the layers 6 and 7 function as this protective layer.

The thickness of the recording layer is decided from the measured results of the reflectivity in the crystalline state and the amorphous state. When the thickness of the recording layer is changed to 20 nm, the reflectivity in the crystalline state is larger than that in the amorphous state and the difference in the reflectivity between the crystalline state and the amorphous state is maximized, so that the thickness of the $(Cr_4Te_5)_{20}(GeSb_2Te_4)_{80}$ film 3 is set to 20 nm.

The disk prepared as mentioned above is initialized as described below first. The disk is precrystallized by flashing light and rotated at 1800 rpm, and the intensity of a semiconductor laser beam with a wave length of 780 nm is kept at a level (about 1 mW) at which the reflectivity adjustment layer is not melted, and the laser beam is focused by the lens mounted in the recording head and illuminated via the substrate 1, and the reflectivity is detected, and the head is driven so that the center of the laser beam spot always coincides with the center of the tracking groove. Automatic focusing is further carried out so as to focus the laser beam on the reflectivity adjustment layer by tracking like this and a continuous laser beam of a power of 11 mW is illuminated onto the same track five times for initial crystallization first. This illumination power may be within a range from 9 to 18 mW. Subsequently, a continuous laser beam of 6 mW is illuminated three times. This illumination power may be within a range from 4 to 9 mW. The above two kinds of laser beams may be illuminated once or more. It is more desirable that the laser beam of higher power is illuminated two times or more.

In a reflectivity adjustment layer including a high melting-point component of SnTi2, it is important to carry out initial crystallization fully so as to improve the value of C/N (carrier-to-noise ratio).

When a semiconductor laser array is used, or a laser beam from a gas laser is divided into a plurality of parts and the divided parts are dislocated and arranged little by little in the radial direction of a disk, or a laser beam from a high-output gas laser or a semiconductor laser is arranged long in the radial direction of a disk as an elliptical laser beam spot, these initial crystallization illuminations can be carried out for many tracks at the same time during one revolution of the disk.

When the peripheral portion of tracks is also crystallized at the end of initialization by a method for illuminating a continuous laser beam by tracking between the grooves, the crosstalk can be reduced by 2 dB. When the reflectivity in the non-recorded portion is measured at a low power such as a read laser power of 1 mW after initialization, it is about 65% on the tracking groove. The reproduced signal modulation degree when a recorded signal is read is about 60%. The reflectivity at the part where there is no tracking groove is about 70%.

Figure 4:
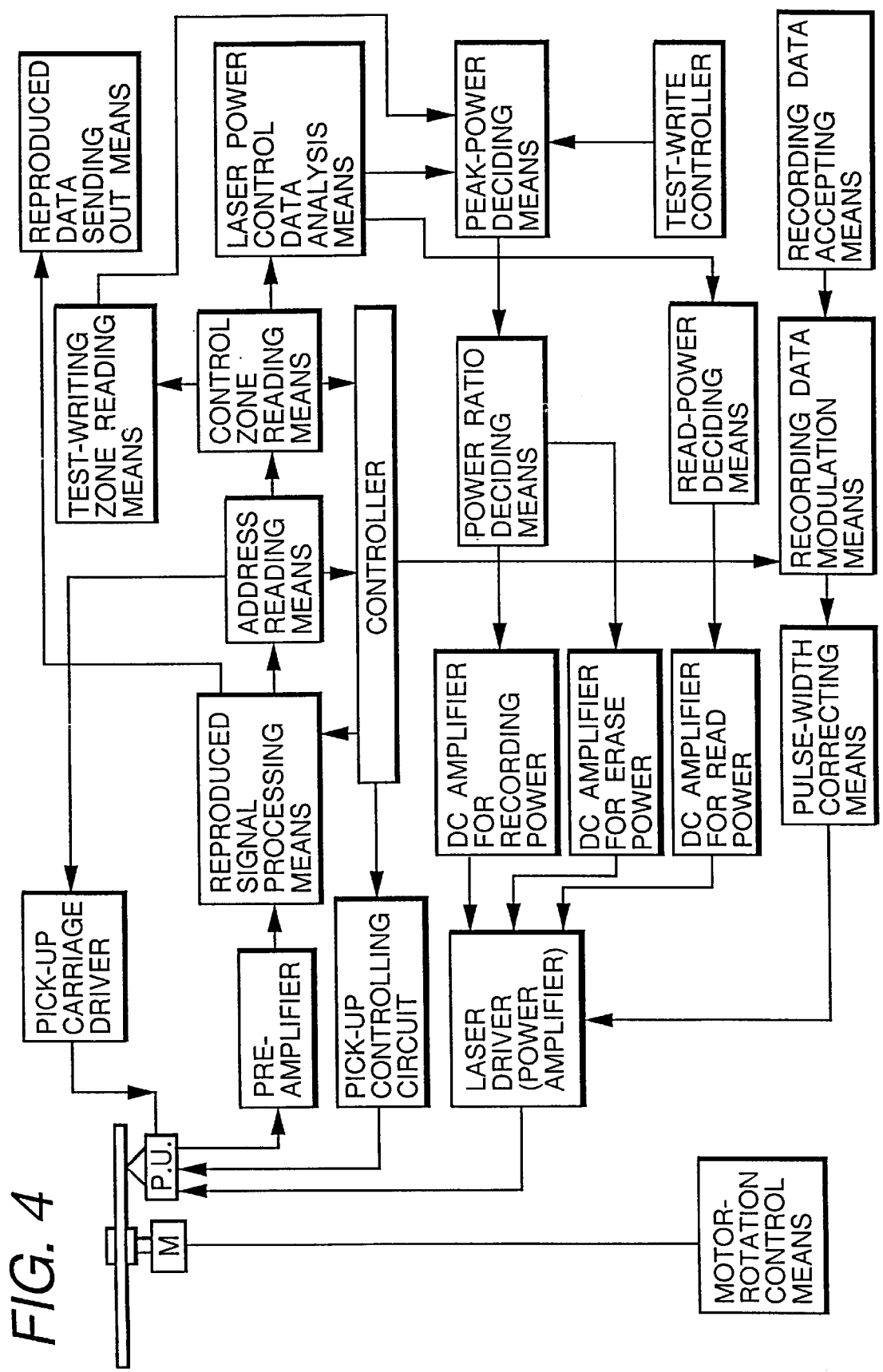
FIG. 4 is a drawing showing the constitution of an apparatus of an embodiment of the present invention.

The disk prepared as mentioned above is mounted in a recording/reproducing apparatus using a semiconductor laser with a wave length of 780 nm, a block diagram of which is shown in FIG. 4 and rotated at a linear velocity of 5.2 m/s on the recording track and a laser beam of a power of 1 mW is illuminated so as to carry out auto focusing and tracking. In the portion which is to be rewritten, the laser power is modulated between 8 mW and 15 mW according to an information signal and data is rewritten. This power varies with the melting-point of the reflectivity adjustment layer. When the laser beam passes through the portion to be rewritten, the laser power is reduced to 1 mW and the tracking and automatic focusing are continued. During rewriting, the tracking and automatic focusing are continued. It is possible that at the first one revolution of the disk, the laser power is kept constant such as at 10 mW and the information written already is erased and at the next revolution, the power is modulated between 1 mW and 15 mW according to an information signal and data is recorded.

After rewriting, the reflectivity adjustment layer is recrystallized, so that crystallization is not necessary.

After rewriting, the laser power is reduced to a read power of 1 mW at the next one revolution of the disk and whether the data is rewritten correctly is read and confirmed. When there exists an error which cannot be corrected, the data is rewritten once again. When an error still exists, it is rewritten in the alternate sector. It is possible that an area for writing in the number of times of rewriting is provided in each sector and when the number of times exceeds the predetermined number of times, rewriting is not carried out in the sector so as to prevent an occurrence of an error.

The information recording apparatus, the information reading apparatus, the information reading method, or the optical recording medium to be used for them in this embodiment comprises, for example, an optical head for illuminating a laser beam to the recording medium and detecting the reflected light, a reproduced signal processing means, an address reading means, a recording data modulation means, a laser power control data analysis means, a peak (recording) power deciding means, a power ratio deciding means, a record and erase current amplifying means, a read power deciding means, a read current amplifying means, and a laser driver.

Figure 3:
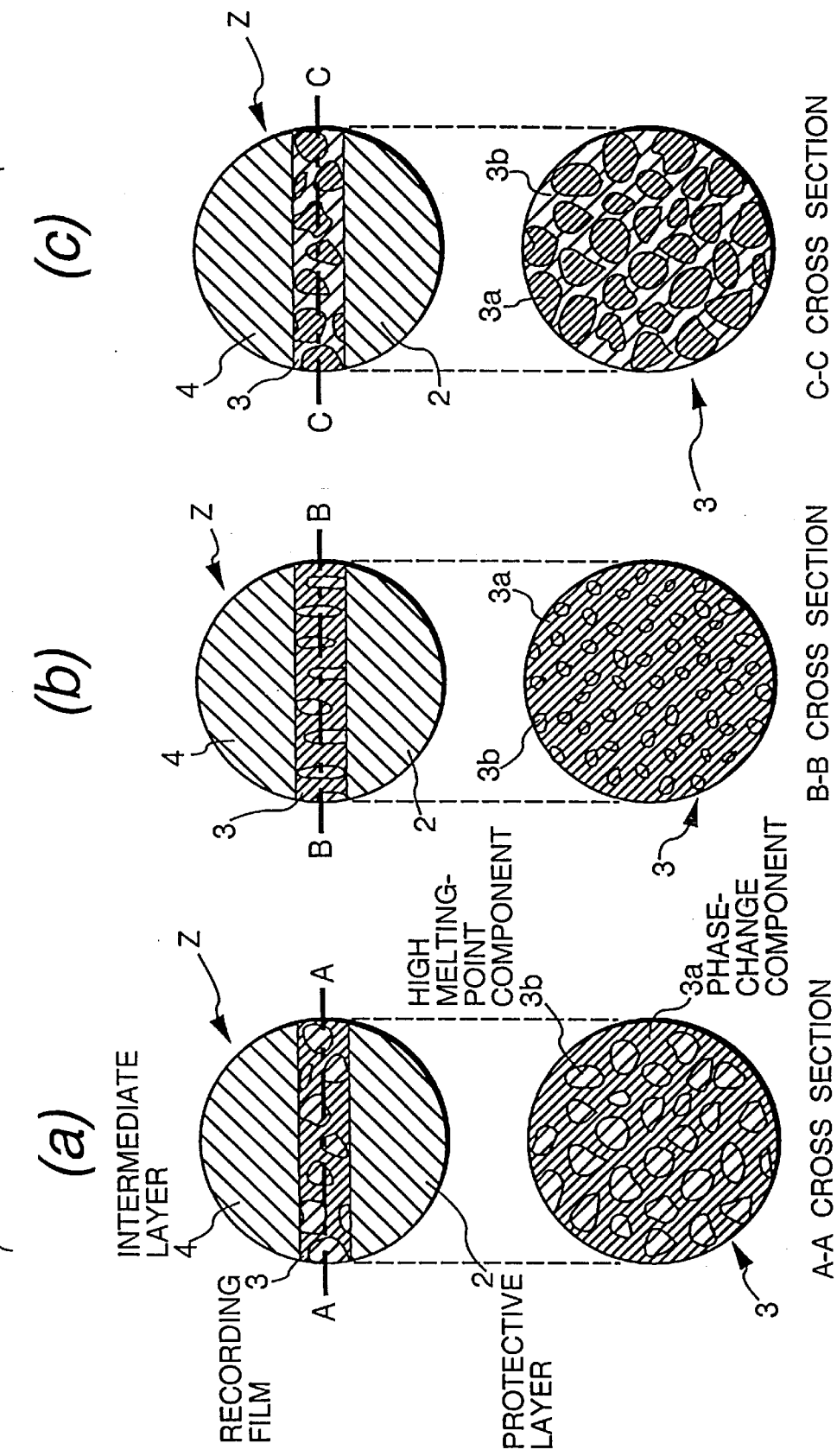
FIG. 3 is a drawing showing the deposition status of a high melting-point component in a reflectivity adjustment layer.

The principle of changing of reflectivity by the reflectivity adjustment layer is as described below. In FIG. 3, numeral 7 indicates a spot of a laser beam or others and 9a and 9b indicate written marks formed on the surface of the substrate. The diameter of the laser beam spot is defined as the diameter of the laser beam at a location where the light intensity reaches 1/e2 of the peak value thereof. When the laser power at the time of recording (rewriting by overwriting) is made higher than that at the time of. reading, in the high-temperature area in the laser beam spot, the reflectivity adjustment layer is melted and at least one of the real part n and the imaginary part k of the complex refractive index is changed (generally reduced), so that,the reflectivity is reduced. As a result, the illuminated laser beam is effectively absorbed and recording (overwriting) can be carried out easily. At the time of illumination of a laser beam at the recording (higher) power level by overwriting, the melted area of the reflectivity adjustment layer grows wider than that at the time of illumination of a laser beam at the erase power level and the amount of light absorption increases relatively. Therefore, it is necessary to reduce the power ratio of the recording power level to the erase power level below that when a disk having no reflectivity adjustment layer is used. Therefore, when the aforementioned power ratio deciding means rewrites information by overwriting, the power ratio of the recording power level to the erase power level is set to a value less than 2 to 1. When the power ratio is within a range from 1.8 to 1 to 1.4 to 1, a satisfactory C/N value and a large erase ratio can be obtained. However, a range from 1.7 to 1 to 1.5 to 1 is particularly desirable.

As to a disk in which the reflectivity adjustment layer is left in the amorphous state after rewriting, it is necessary to crystallize it. As to a disk having a film composition which is recrystallized after reading, crystallization is not necessary.

When the reflectivity during overwriting is measured by illuminating a continuous laser beam of 6 mW which is the lower limit of the erase power margin, it is about 40%. The reason is that the reflectivity adjustment layer is melted. When a solid is melted, a sudden change is generated in the optical constants (refractive index, extinction coefficient). The reason is that the melted area of the reflectivity adjustment layer is extended. When the laser power is increased, the reflectivity is reduced further.

When the reflectivity at a portion having a high reflectivity on the recording track is 40% or lower at the time of illumination of strong light, data can be recorded at a practical recording laser power of 20 mW or lower.

When information is rewritten by overwriting, it is desirable that the information for setting the power ratio of the recording power level to the erase power level is set to a value less than 2 to 1 is written on the optical recording medium (for example, the control zone).

In the case of a rewriting type recording medium which is of a write-once type or cannot be overwritten, it is desirable that it comprises at least an optical head for illuminating a laser beam to the recording medium and detecting the reflected light, a reproduced signal processing means, an address reading means, a recording data modulation means, a laser power control data analysis means, a peak power deciding means, a record current amplifying means, a read power deciding means, a read current amplifying means, and a laser driver and the peak power deciding means has a function for setting the laser power so that the reflectivity of the optical recording medium becomes a low value in at least a part of the rewriting time when information is rewritten.

In the case of an optical recording medium which can be overwritten, it is desirable that it comprises at least an optical head for illuminating a laser beam to the recording medium and detecting the reflected light, a reproduced signal processing means, an address reading means, a recording data modulation means, a laser power control data analysis means, a peak power deciding means, a power ratio deciding means, a record and erase current amplifying means, a read power deciding means, a read current amplifying means, and a laser driver and the power ratio deciding means and the power ration deciding means have a function for setting the laser power so that the reflectivity of the optical recording medium becomes a low value in at least a part of the rewriting time when information is rewritten.

It is desirable that the recording medium described in this embodiment has a property that when a high-power laser beam is illuminated, the reflectivity reduces greatly and when the power of the laser beam is lowered, the reflectivity returns to a high value and the information for setting the laser power so that the optical constant of the reflectivity adjustment layer of the optical recording medium changes greatly in at least a part of the rewriting time when the information is rewritten is written on the optical recording medium (for example, the control zone).

It is desirable that an information processor comprises at least an optical recording medium having a property that the reflectivity is changed suddenly at the predetermined laser power, an optical head for illuminating a laser beam to the recording medium and detecting the reflected light, a reproduced signal processing means, an address reading means, a recording data modulation means, a laser power control data analysis means, a peak power deciding means, a record current amplifying means, a read power deciding means, a read current amplifying means, and a laser driver and the peak power deciding means has a function for setting the output of the laser beam for recording to an output at which the whole film is not melted in any area of the reflectivity adjustment layer of the optical recording layer.

It is desirable that the information for setting the output of a laser beam to an output at which the whole film is not melted even in the area of a reflectivity adjustment layer of an optical recording medium where the temperature is highest is written on the optical recording medium (for example, the control zone).

It is desirable that an information processor comprises at least an optical head for illuminating a laser beam to the recording medium and detecting the. reflected light, a reproduced signal processing means, an address reading means, a read power deciding means, and a read current amplifying means and when information is read from an optical recording medium having a particularly high recording density, the read power deciding means has a function for setting the read laser power to an intermediate value between the laser power at which the information recorded on the optical recording medium is changed while a laser beam spot passes on the optical recording medium once and the lowest laser power at which the reflectivity of the optical recording medium is changed to a low value.

It is desirable that the recording medium described in this embodiment has a property that when a high-power laser beam is illuminated, the reflectivity reduces greatly and when the power of the laser beam is lowered, the reflectivity returns to a high value and the information for setting the read laser power to an intermediate value between the laser power at which the information recorded on the optical recording medium is changed while a laser beam spot passes on the optical recording medium once and the lowest laser power at which the reflectivity of the optical recording medium is changed to a low value is written on the optical recording medium (for example, the control zone).

When the laser power is made low so that the reflectivity adjustment layer is not melted at all or little melted at the time of reading, the reflectivity when a laser beam spot is in the crystalline portion of the recording film is 60% or higher and 75% when a disk having a maximum reflectivity is used. Assuming the value of this reflectivity as R, the reflectivity when the center of a laser beam spot is on an amorphous written mark is R×0.4 or lower. The reason that a high reflectivity and a high contrast ratio like this are obtained is that a reflectivity adjustment layer is mounted on the light incoming side and the temperature of this layer is kept lower than the temperature at which a great change occurs in the optical constant due to temperature rise. When the relationship between the laser power Pe and the read laser power Pr is within the range expressed by the following formula, a satisfactory rewriting characteristic is obtained.

Pe/Pr≧2

Reading is carried out with the power Pr kept at a low value satisfying the above formula. In a short time without the temperature being changed greatly, the power Pr may be changed to another power in a pulse shape and returned to the original state.

Therefore, it is desirable that a reading apparatus comprises at least an optical head for illuminating a laser beam to a recording medium and detecting the reflected light, a reproduced signal processing means, an address reading means, a read power deciding means, and a read current amplifying means and the read power deciding means sets the read laser power to a value lower than the lowest laser power at which the reflectivity of the optical recording medium is changed to a low value.

It is desirable that an optical recording medium has a property that when a high-power laser beam is illuminated, the reflectivity reduces greatly and when the power of the laser beam is lowered, the reflectivity returns to a high value like the optical recording medium described in this embodiment and the information for setting the read laser power to a value lower than the lowest laser power at which the reflectivity of the optical recording medium is changed to a low value is written on the optical recording medium (for example, the control zone).

It is also desirable that an information reading method reads information recorded on an optical recording medium in which the reflectivity at the time of illumination of weak light is high and the reflectivity at the same portion at the time of illumination of strong light is low from a compact disk, a CD-ROM disk, or an optical video disk by an information reading apparatus.

It is desirable that an information reading method reads information recorded, for example, on the optical recording medium described in this embodiment in which the reflectivity at a portion having a high reflectivity on the recording track is 60% or higher at the time of illumination of weak light and the reflectivity at the same portion is 40% or lower at the time of illumination of strong light from a compact disk, a CD-ROM disk, or an optical video disk by an information reading apparatus.

It is desirable that an information processor comprises at least the recording medium described in this embodiment having a property that when a high-power laser beam is illuminated, the reflectivity reduces greatly and when the power of the laser beam is lowered, the reflectivity returns to a high value, an optical head for illuminating a laser beam to the recording medium and detecting the reflected light, a reproduced signal processing means, an address reading means, a recording data modulation means, a laser power control data analysis means, a peak power deciding means, a record current amplifying means, a read power deciding means, a read current amplifying means, a laser driver, a test-writing zone reading means, and a test writing controller, and the test-writing controller has at least a function for performing test-writing at the time of replacement of a recording medium, and the test-writing zone reading means has a function for reading the test-writing result and when a laser power at which satisfactory. recording can be carried out is found, sending the information to the peak power deciding means, or the peak power deciding means and the peak (recording) and erase power ratio deciding means.

It is desirable that an optical recording medium has a property that when a high-power laser beam is illuminated, the reflectivity reduces greatly and when the power of the laser beam is lowered, the reflectivity returns to a high value and includes a test-writing zone partially.

It is desirable that an information processor comprises at least a recording medium having a property that when a high power laser beam is illuminated, the reflectivity adjustment layer is melted and the reflectivity reduces greatly and when the power of the laser beam is lowered, the reflectivity returns to a high value, an optical head for illuminating a laser beam to the recording medium and detecting the reflected light, a reproduced signal processing means, an address reading means, a recording data modulation means, a pulse-width correcting means, a laser power control data analysis means, a peak power deciding means, a record current amplifying means, a read power deciding means, a read current amplifying means, and a laser driver and the pulse-width correcting means has a function for preventing the written mark length from becoming longer than the original length thereof due to a change in the melting area of the reflectivity adjustment layer by narrowing the pulse width.

According to the present invention, the wave length of a laser beam for recording and reading is generally within a range from 780 nm to 830 nm. However, any wave length beyond the range may be used if necessary. A wave length of 780 nm is particularly desirable because the laser beam spot becomes small.

When the ratio of Au to Sn which are phase-change components in the reflectivity adjustment layer is changed so as to change the melting-point and the difference between the changed melting-point and the melting-point of about 600° C. of the phase-change component of the recording film is changed, the recording laser power is changed as shown below.

| Melting point of reflectivity adjustment layer | Difference in melting-point | Recording laser power |
| --- | --- | --- |
| 600° C. | 100° C. | 30 mW |
| 500° C. | 200° C. | 25 mW |
| 450° C. | 250° C. | 20 mW |
| 400° C. | 300° C. | 18 mW |
| 300° C. | 400° C. | 15 mW |

The above table shows that when the melting-point of the reflectivity adjustment layer is lower by 250° C. or more, a satisfactory recording sensitivity is obtained.

When the content (ratio of the sum of the numbers of atoms Sn and atoms Ti to the total number of atoms) of Sn and Ti which are high melting-point components in the reflectivity adjustment layer is changed, the recording laser power is changed as shown below.

| Content of high melting-point components | Recording laser power |
| --- | --- |
| 20% | 20 mW |
| 40% | 25 mW |
| 45% | 28 mW |

The above table shows that when 60% or more of the reflectivity adjustment layer comprises a metallic element having a melting-point of 450° C. or lower or at least two kinds of metals having a melting-point of 450° C. or lower, a satisfactory recording sensitivity is obtained.

When the reflectivity adjustment layer has an eutectic alloy composition or a composition close to it, for example, the melting-point of $Au_{70}Sn_{30}$ is about 300° C. and a particularly low recording laser power (high sensitivity) such as 15 mW is obtained as shown in the above table.

Even if a part or the whole of the Au—Sn alloy used as a phase-change component of the reflectivity adjustment layer is replaced with at least one of the alloys Au—Ge, Au—Si, Au—Sb, Au—In, Au—Ga, Ag—Sn, Ag—Ge, Ag—In and Ag—Ga, a similar result is obtained. However, when Au—Ge or Au—Si is used, the recording laser power is increased by 2 to 3 mW. When Ag—Sn or Ag—Ge is used, the reflectivity at the time of reading at a low power is reduced by about 5%. Even when Au—Sb is used, the laser power is increased and when Au-In, Au—Ga, Ag—In, or Ag—Ga is used, the reflectivity is reduced.

Namely, when the reflectivity adjustment layer has an eutectic alloy composition of a transition metal and a principal group metal or a composition close to it, a high sensitivity ca n be generally obtained easily.

An alloy including Al—Au, Al—Ag, or Al—Cu as a main component also can b e used.

In this embodiment, the reflectivity adjustment layer exists on the side opposite to the reflection layer for the recording layer. However, even if the reflectivity adjustment layer exists between the recording layer and the reflection layer, the optical interference condition changes according to the power of a laser beam to be illuminated, so that the reflectivity can be changed. As an example, when the reflectivity adjustment layer of the present invention is put between the recording layer and the reflection layer so as to divide the intermediate layer into two equal parts in the direction of the thickness, the reflectivity during reading at a low laser power is reduced by about 10%, though a reflectivity adjustment effect for recording is obtained.

When the composition ratio of the reflectivity adjustment layer is changed, the recording sensitivity is improved by 30% or more against that when at least one of the real part and the imaginary part of the complex refractive index is not changed by 20% or more by illumination of light.

In place of $ZnS$—$SiO_2$ used in at least one of the protective layer and the intermediate layer, an oxide or a nitride such as an Si—N base material, an Si—O—N base material, or an Al—Si—N base material such as $SiO_2$, SiO, $TiO_2$, $Al_2O_3$, or $Y_2O_3$, or TaN, AlN, or $AlSiN_2$, a sulfide such as ZnS or $Sb_2S_3$, a selenide such as $SnSe_2$ or $Sb_2Se_3$, a fluoride such as CeF3, an amorphous substance such as Si, $TiB_2$, $B_4C$, B, or C, or a substance having a composition close to one of all the protective materials mentioned above may be used. Two or more kinds of films among them may be used as a laminated layer comprising two or more laminated layers. Each protective layer may be formed from fluorine plastics such as acrylic resin, polycarbonate, polyolefin, epoxy resin, polyimide, polystyrene, polyethylene, polyethylene terephthalate, or polytetrafluoroethylene (Teflon). It may be formed by ethylene-vinyl acetate copolymer known as a hot-melt adhesive or an adhesive. It may be formed by an ultraviolet curing resin having at least one of these resins as a main component. An organic substrate may function as a protective layer. Or, a layer of mixed materials or a multi-layer may be used. When the intermediate layer is omitted, the rewriting sensitivity is reduced by about 30% and the possible number of rewritings is also reduced. When the refractive index of the intermediate layer is within a range from 1.7 to 2.3 and the film thickness is within a range from 3 nm to 400 nm, a C/N value of 48 dB or more is obtained.

In place of Au used in the reflection layer, a single substance of Al, Ag, Cu, C, Si, Ge, Al, Ni, Fe, Co, Cr, Ti, Pd, Pt, W, Ta, Mo, or Sb, or an alloy, a compound, or a mixture including one of them as a main component, or a layer of an alloy or a multi-layer comprising some of them or some of them and Au, or a composite layer of some of them and another substance such as an oxide may be used. A golden-colored Al alloy used in a compact disk may be used. In the case of other than an alloy of Au or including Au as a main component, the maximum reflectivity is reduced. An alloy including Au as a main component (50 atomic % or more, more desirable when 85 atomic % or more is included) is particularly desirable because the thermal conductivity is reduced and the recording sensitivity is increased.

In place of the polycarbonate substrate, on the surface of which irregularities such as a tracking guide are directly formed as a substrate, a polyolefin, epoxy, or acrylic resin substrate, a chemically reinforced glass substrate, on the surface of which an ultraviolet curing layer is formed, or an acrylic or epoxy resin substrate may be used.

Image information is recorded on a disk in this embodiment and then the disk is set in a CD-ROM drive on the market and reading is,tested. The result shows that the disk can be read normally. On the other hand, in the case of a disk in which the reflectivity at a portion other than the written mark is 60% or lower, it is difficult to read by the CD-ROM drive. In the following embodiment, when rewriting is repeated, a period for keeping the state that the disk can be read by the CD-ROM drive is assumed as a rewritable number.

Figure 1:
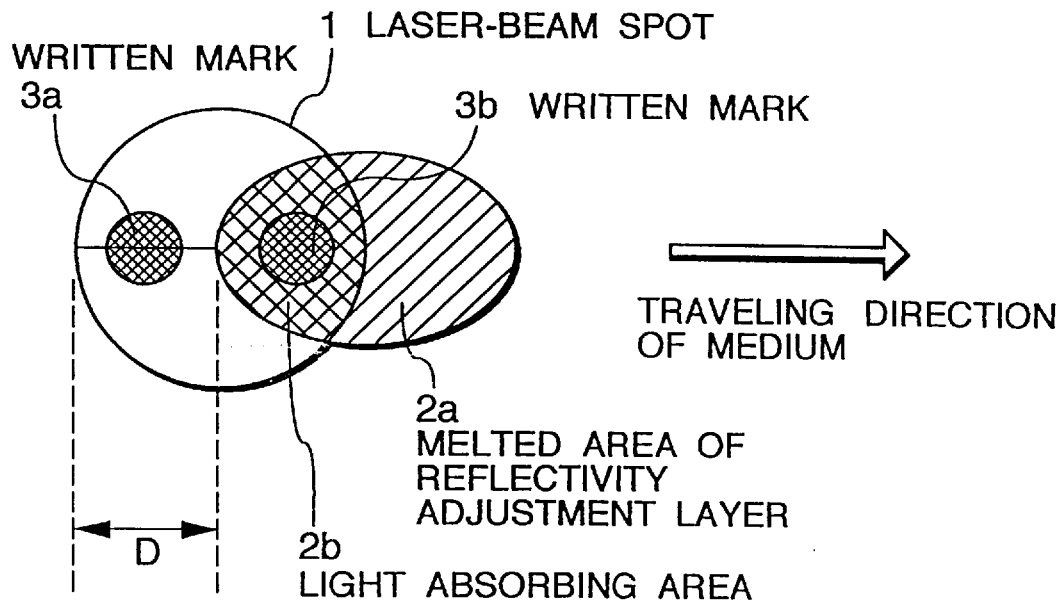
FIG. 1 is an operation principle drawing of a reflectivity adjustment layer.

A disk using the reflectivity adjustment layer shown in FIG. 1 has a one side structure. However, in place of the polycarbonate substrate 1' for adhering, a double side structure in which two disks having the same structure are prepared and adhered to each other via an adhesion layer 6 may be used.

When the thickness of the reflectivity adjustment layer is within a range from 8 nm to 50 nm, a satisfactory characteristic is obtained. When the thickness is less than 8 nm, a reflectivity of 60% cannot be realized and when the thickness is more than 50 nm, the reproduced signal modulation degree is reduced. When the thickness of the reflectivity adjustment layer is within a range from 10 nm to 20 nm, a particularly satisfactory characteristic is obtained.

Embodiment 2

In the reflectivity adjustment layer 6 of $(Au_{70}Sn_{30})_{80}(SnTi_2)_{20}$ described in Embodiment 1, when the contents of Sn and Ti are changed with the content of Au kept constant, the possible number of rewritings and the C/N value of the reproduced signal after 10 times of rewritings are changed as shown below.

| Composition | Possible number of rewritings |
| --- | --- |
| $Sn_{55}Au_{20}Ti_{25}$ | >20 times |
| $Sn_{67}Au_{20}Ti_{13}$ | 20 times |
| $Sn_{75}Au_{20}Ti_5$ | 10 times |
| $Sn_{80}Au_{20}$ | 5 times |

| Composition | C/N of reproduced signal after 10 times of rewritings |
| --- | --- |
| $Sn_{25}Au_{20}Ti_{55}$ | 44 dB |
| $Sn_{30}Au_{20}Ti_{50}$ | 46 dB |
| $Sn_{40}Au_{20}Ti_{40}$ | 48 dB |
| $Sn_{55}Au_{20}Ti_{25}$ | 50 dB |

The above table shows that it is desirable that the ranges of e and f given in the aforementioned general formula (3) are $30 \leq e \leq 95$ and $5 \leq f \leq 50$ and more desirable that they are $40 \leq e \leq 87$ and $13 \leq f \leq 40$. It is desirable that Au—Su which is a phase-change component has an eutectic composition of a low melting-point or a composition close to it.

Furthermore, in the aforementioned reflectivity adjustment layer 6 including $(Sn_3Au)_{80}(SnTi_2)_{20}$, when Tl is added with the contents of Sn, Au, and Ti kept constant and the content of Tl is changed as shown below, the C/N value of the reproduced signal after 10 times of rewritings is changed as shown below.

| Content of Tl | C/N of reproduced signal after 10 times of rewritings |
| --- | --- |
| g = 0% | 46 dB |
| g = 10% | 48 dB |
| g = 20% | 46 dB |
| g = 25% | 43 dB |

The above table shows that it is desirable that the range of g given in the aforementioned general formula (3) is $0 \leq g \leq 20$ and more desirable that it is $0 \leq g \leq 10$.

In a combination of A, A' (when A indicates two elements A and A' such as Sn and Au), B, and C, it is desirable that a high melting-point component produced from a combination of A-B, B-C, and A'-B has no eutectic point or that even when having an eutectic point, the melting-point is higher than the melting-point of each of A and A-A' by 150° C. or more.

Embodiment 3

Even if the reflectivity,adjustment layer 6 including Au—SnTi shown in Embodiment 1 is changed to one of the materials of the mean composition expressed by the formula (1) such as Au—Ge—Ti, Au—Si—Ti, Au—Sb—Ti, Au—In—Ti, Au—Ga—Ti, Ag—Sn—Ti, Ag—Ge—Ti, Ag—In—Ti, Ag—Ga—Ti, Au—Sn—Pt, Au—Si—Pt, Au—In—Pt, Au—Ga—Pt, Ag—Sn—Pt, Ag—In—Pd and Ag—Ga—Pd, the same result is obtained.

Embodiment 4

In the disk of Embodiment 1, when the composition of the reflectivity adjustment layer is changed as shown below, the amount of variation $\Delta R$ of the reflectivity during recording is changed. When the amount of variation of the reflectivity when a written mark with a length which is about 25% of the diameter of a laser beam spot on disks having these reflectivity adjustment layers is formed is examined, the following results are obtained.

| Film composition | Amount of variation of reflectivity during recording |
| --- | --- |
| $(Au_{70}Sn_{30})_{80}(SnTi_2)_{20}$ | $\Delta R = 5\%$ |
| $(Au_{70}Sn_{30})_{60}(SnTi_2)_{40}$ | $\Delta R = 10\%$ |
| $(Au_{70}Sn_{30})_{40}(SnTi_2)_{60}$ | $\Delta R = 20\%$ |
| $(Au_{70}Sn_{30})_{20}(SnTi_2)_{80}$ | $\Delta R = 30\%$ |

The above table shows that it is desirable that the content of $SnTi_2$ when $20\% \leq \Delta R$ is 40% or less. The possible number of rewritings when the content of $SnTi_2$ is 20% or more is 3 times or more of that when there is contained no $SnTi_2$.

Embodiment 5

In the disk of Embodiment 1, when the ratio of Sn and Ti of $SnTi_2$ which is a high melting-point component of the reflectivity adjustment layer is changed so as to change the melting-point, the difference between the changed melting-point and the melting-point about 280° C. of $Au_{70}Sn_{30}$ is 150° C. or more and the possible number of rewritings is 100 times or more. When the difference is 500° C. or more, the possible number of rewritings is 300 times or more.

Embodiment 6

As shown in FIG. 3, when the crystallization velocity of the high melting-point component in the reflectivity adjustment layer is faster than that of the phase-change component, the high melting-point component is deposited as a massive (a) or columnar (b) deposit. When the crystallization velocity of the phase-change component is faster than that of the high melting-point component, the high melting-point component is deposited as a porous deposit (c). Since a high melting-point component is deposited like this, the flow and segregation when the reflectivity adjustment layer is melted by illumination of a laser beam during rewriting can be prevented and as a result, the possible number of rewritings is improved.

When the high melting-point component in the reflectivity adjustment layer is deposited as a massive (a) or columnar (b) deposit, if the gas pressure for sputtering the high melting-point component is lowered or the temperature of the substrate is increased depending on the preparation condition of the reflectivity adjustment layer, the deposit increases in size. Therefore, the relationship between the size of deposit and the rewriting characteristic is examined.

In this specification, "maximum external dimension d", "heights h and h'", "inter-center distance i", "maximum hole dimension p'", and "maximum wall thickness w" of a deposit of a high melting-point component are defined respectively as described below.

When a deposit of a high melting-point component is independently distributed as shown in FIGS. 3(a) and 3(c), a cross section (hereinafter called a first reference cross section) in parallel with the film surface of the reflectivity adjustment layer in the location at a distance of ⅓ of the film thickness T of the reflectivity adjustment layer from one of the interfaces of the reflectivity adjustment layer is considered and the length of the deposit of each high melting-point component in the cross section is measured. The maximum value of length measured in an optional direction is assumed as a "maximum external dimension d".

Concretely, when the shape in the first reference cross section is a circle or close to a circle, the "maximum external dimension d" means the diameter of a deposit, and when the shape is an ellipse or close to an ellipse, it means the major axis of a deposit, and when the shape is a polygon, it means the length of a longest diagonal line of a deposit.

As to the "height h", a cross section (hereinafter called a second reference cross section) perpendicular to the film surface of the reflectivity adjustment layer is considered and the length of the deposit of each high melting-point component in the direction perpendicular to the film surface of the reflectivity adjustment layer in the cross section is measured.

This "height h", is applied to a case that a granular deposit of a high melting-point component is distributed in the reflectivity adjustment layer and a case that a columnar deposit of a high melting-point component is distributed in contact with both interfaces of the reflectivity adjustment layer.

The "height h'" is in the same conception as with the "height h" mentioned above, except that it is applied to a case that a columnar deposit of a high melting-point component is distributed in contact with only one of the interfaces of the reflectivity adjustment layer.

The "inter-center distance i" means the mean value of distances between the centers of deposits of two neighboring high melting-point components in the first reference cross section.

The "maximum hole dimension p'" is applied to a case that a porous high melting-point component is deposited as shown in FIG. 3(c) and means the maximum value of size of each hole of the deposit of the high melting-point component in the first reference cross section.

Concretely, when the hole shape in the first reference cross section is a circle or close to a circle, the "maximum hole dimension p'" means the hole diameter, and when the shape is an ellipse or close to an ellipse, it means the major axis of a hole, and when the shape is a polygon, it means the length of a longest diagonal line of a hole.

The "maximum wall thickness w" is applied to a case that a porous high melting-point component is deposited as with the "maximum hole dimension p'" and means the maximum value of wall thicknesses between two neighboring holes of a deposit of the high melting-point component in the first reference cross section.

When the "maximum external dimension d" of deposits of the high melting-point component is different from each other, the possible number of rewritings and the C/N value of the reproduced signal after $10^5$ times of rewritings are changed as shown below.

| Maximum external dimension | Possible number of rewritings |
|---|---|
| d = 50 nm | >20 times |
| d = 30 nm | >20 times |
| d = 10 nm | 20 times |
| d = 5 nm | 10 times |
| d = 1 nm | 5 times |

| Maximum external dimension | C/N of reproduced signal after 10 times of rewritings |
|---|---|
| d = 80 nm | 44 dB |
| d = 50 nm | 46 dB |
| d = 20 nm | 48 dB |
| d = 15 nm | 49 dB |
| d = 5 nm | 59 dB |

The above table shows that a range of 5 nm$\leq$d$\leq$50 nm is desirable.

When a columnar high melting-point component is deposited on both interfaces of the reflectivity adjustment layer 3, if the "height h" of deposits is different from each other, the possible number of rewritings is changed as shown below.

| Height | Possible number of rewritings |
|---|---|
| h = 30 nm | >20 times |
| h = 20 nm | 20 times |
| h = 10 nm | 10 times |
| h = 0 nm | 5 times |

The above table shows that a range of 10 nm$\leq$h is desirable.

When a columnar high melting-point component is deposited on one of the interfaces of the reflectivity adjustment layer 3, if the "height h'" of deposits is different from each other, the possible number of rewritings is changed as shown below.

| Height | Possible number of rewritings |
|---|---|
| h' = 20 nm | >20 times |
| h' = 10 nm | 20 times |
| h' = 5 nm | 10 times |
| h' = 1 nm | 5 times |

The above table shows that a range of 5 nm$\leq$h' is desirable. When the "inter-center distance i" of deposits is different from each other, the possible number of rewritings and the C/N value of the reproduced signal after 10 times of rewritings are changed as shown below. The change in the C/N value mainly depends on a change in the C level.

| Inter-center distance | Possible number of rewritings |
|---|---|
| i = 120 nm | 1 time |
| i = 90 nm | 5 times |
| i = 70 nm | 10 times |
| i = 60 nm | 20 times |
| i = 40 nm | >20 times |
| i = 15 nm | >20 times |

| Inter-center distance | C/N of reproduced signal after 10 times of rewritings |
|---|---|
| i = 70 nm | 50 dB |
| i = 40 nm | 50 dB |
| i = 30 nm | 49 dB |
| i = 20 nm | 48 dB |
| i = 15 nm | 46 dB |
| i = 10 nm | 44 dB |
| i = 5 nm | 40 dB |

The above table shows that a range of 15 nm$\leq$i$\leq$70 nm is desirable.

When the high melting-point component in the reflectivity adjustment layer is deposited as a porous (c) deposit, if the gas pressure for sputtering the phase-change component target is lowered or the temperature of the substrate is increased depending on the preparation condition of the reflectivity adjustment layer, the holes increase in size. Therefore, the relationship between the hole size and the rewriting characteristic is examined.

When the high melting-point component is deposited porously in connection with each other in the direction of the film surface as shown in FIG. 3(c), if the "maximum hole dimension p'" of deposits is different from each other, the possible number of rewritings is changed as shown below.

| Maximum hole dimension | Possible number of rewritings |
|---|---|
| p' = 50 nm | 20 times |
| p' = 60 nm | 20 times |
| p' = 80 nm | 10 times |
| p' = 100 nm | 5 times |

The above table shows that a range of p'$\leq$80 nm is desirable.

When the "maximum wall thickness w" of the porous high melting-point component is different from each other, the C/N value of the reproduced signal after 10 times of rewritings is changed as shown below. The change in the C/N value mainly depends on a change in the C level.

| Maximum wall thickness | C/N of reproduced signal after 10 times of rewritings |
|---|---|
| w = 5 nm | 50 dB |
| w = 15 nm | 49 dB |
| w = 20 nm | 46 dB |
| w = 35 nm | 40 dB |

The above table shows that a range of w≦20 nm is desirable.

Each of the aforementioned relationships is almost fit also for a recording film including a high melting-point component. As to a phase-change component other than the aforementioned recording film Ge46Te46Se8, even if it is replaced with at least one composition of the group D indicated below, or a composition close to it, or a compound having a melting-point of 650° C. or lower, or a composition close to it, or at least one of a mixed composition thereof and compounds of 3 elements or more close to the mixed composition, the same result is obtained.

<Group D>

Sn, Pb, Sb, Te, Zn, Cd, Se, In, Ga, S, Tl, Mg, $Tl_2Se$, TlSe, $Tl_2Se_3$, $Tl_3Te_2$, TlTe, InBi, $In_2Bi$, TeBi, Tl—Se, Tl—Te, Pb—Sn, Bi—Sn, Se—Te, S—Se, Bi—Ga, Sn—Zn, Ga—Sn, Ga—In, $In_3SeTe_2$, $AgInTe_2$, $GeSb_4Te_7$, $GeSb_2Te_4$, $Ge_2Sb_2Te_5$, GeTe, $GeBi_4Te_7$, $GeBi_2Te_4$, $Ge_3Bi_2Te_6$, $Sn_2Sb_6Se_{11}$, $Sn_2Sb_2Se_5$, $SnSb_2Te_4$, $Pb_2Sb_6Te_{11}$, $CuAsSe_2$, $Cu_3AsSe_3$, $CuSbS_2$, $CuSbSe_2$, InSe, $Sb_2Se_3$, $Sb_2Te_3$, $Bi_2Te_3$, SnSb, FeTe, $Fe_2Te_3$, $FeTe_2$, ZnSb, $Zn_3Sb_2$, $VTe_2$, $V_5Te_8$, $AgIn_2$, BiSe, InSb, $In_2Te$, $In_2Te_5$, $Ba_4Tl$, $Cd_{11}Nd$, $Ba_{13}Tl$, $Cd_6Nd$, $Ba_2Tl$

Among them, the compositions including GeTe as a main component are particularly desirable because a high reflectivity can be easily obtained.

It is desirable that the mean composition of a substance which can substitute for $Au_{70}Sn_{30}$ which is a phase-change component of the reflectivity adjustment layer is at least one of the compositions of the group E indicated below, or a composition close to it, or an alloy, a mixture, or a compound having a melting-point of 450° C. or lower.

<Group E>

$Au_{70}Sn_{30}$, $Au_{75}Ge_{25}$, Au—Sb, $Au_{80}Si_{20}$, $Au_{65}Ga_{35}$, Au—In, Ag—Sn, Ag—In, Ag—Ga, $Al_{70}Ge_{30}$, Ag—Ge, Sn, Pb, Te, Zn, Cd, Se, In, Ga, S, Tl, $Tl_2Se$, TlSe, $Tl_2Se_3$, $Tl_3Te_2$, TlTe, InBi, $In_2Bi$, TeBi, Tl—Se, Tl—Te, Pb—Sn, Bi—Sn, Se—Te, S—Se, Bi—Ga, Sn—Zn, Ga—Sn, Ga—In, $Ba_4Tl$

Among them, at least one of $Au_{70}Sn_{30}$, $Au_{75}Ge_{25}$, Au—Sb, $Au_{80}Si_{20}$, $Au_{65}Ga_{35}$, Au—In, Ag—Sn, Ag—In and Ag—Ga or a composition close to it is particularly desirable.

It is more desirable from a viewpoint of the possible number of rewritings that the mean composition of the phase-change component of the reflectivity adjustment layer is at least one of the compositions of the group F indicated below, or a composition close to it, or an alloy, a mixture, or a compound having a melting-point of 250° C. or lower. However, from a viewpoint of the high reflectivity, the alloys of the group E are desirable.

<Group F>

Sn, Se, In, Ga, S, InBi, $In_2Bi$, TeBi, Tl—Se, Tl—Te, Pb—Sn, Bi—Sn, Se—Te, S—Se, Bi—Ga, Sn—Zn, Ga—Sn, Ga—In

As to a high melting-point component other than $Cr_4Te_5$ of the recording layer and $SnTi_2$ of the reflectivity adjustment layer, even if it is replaced with at least one of the following compounds or alloys, or a composition close to it, or at least one of a mixed composition thereof and compounds of 3 elements or more close to the mixed composition, the same result is obtained.

(a) When the melting-point of the phase-change component of at least one of the reflectivity adjustment layer and the recording layer is between 450° C. and 750° C., a compound of the group G indicated below or a compound having a melting-point of 800° C. or higher can be employed.

<Group G>

$BaPd_2$, $BaPd_5$, NdPd, $NdPd_3$, $NdPd_5$, $Nd_7Pt_3$, $Nd_3Pt_2$, NdPt, $Nd_3Pt_4$, $NdPt_2$, $NdPt_5$, $Bi_2Nd$, BiNd, $Bi_3Nd_4$, $Bi_3Nd_5$, $BiNd_2$, $Cd_2Nd$, CdNd, $Mn_2Nd$, $Mn_{23}Nd_6$, $Mn_{12}Nd$, $Nd_5Sb_3$, $Nd_4Sb_3$, NdSb, $NdSb_2$, $Fe_2Nd$, $Fe_{17}Nd_2$, $Cs_3Ge_2$, CsGe, $CsGe_4$, $Nd_5Si_3$, $Nd_5Si_4$, NdSi, $Nd_3Si_4$, $Nd_2Si_3$, $Nd_5Si_9$, $Cs_2Te$, $NdTe_3$, $Nd_2Te_5$, $NdTe_2$, $Nd_4Te_7$, $Nd_2Te_3$, $Nd_3Te_4$, NdTe, $Ce_3Ir$, $Ce_2Ir$, $Ce_{55}Ir_{45}$, $CeIr_2$, $CeIr_3$, $Ce_2Ir_7$, $CeIr_5$, CaPd, $CaPd_2$, CaGe, $Ca_2Ge$, $GeNa_3$, GeNa, $CaSi_2$, $Ca_2Si$, CaSi, $Se_2Sr$, $Se_3Sr_2$, SeSr, $GeSr_2$, GeSr, $Ge_2Sr$, SnSr, $Sn_3Sr_5$, $SnSr_2$, $Ce_2Tl$, $Ce_5Tl_3$, $CeTl_3$, $Ce_3Tl_5$, CeTl, $BaTl$, $Pd_{13}Tl_9$, $Pd_2Tl$, $Pd_3Tl$, $Mg_2Si$, $Mg_2Ge$, $BaPd_2$, $BaPd_5$, $Ce_4Se_7$, $Ce_3Se_4$, $Ce_2Se_3$, CeSe, $Ce_5Ge_3$, $Ce_4Ge_3$, $Ce_5Ge_4$, CeGe, $Ce_3Ge_5$, $Ce_5Si_3$, $Ce_3Si_2$, $Ce_5Si_4$, CeSi, $Ce_3Si_5$, $CeSi_2$, $CeTe_3$, $Ce_2Te_5$, $CeTe_2$, $Ce_4Te_7$, $Ce_3Te_4$, CeTe, $La_3Se_7$, $LaSe_2$, $La_4Se_7$, $La_2Se_3$, $La_3Se_4$, LaSe, $GeLa_3$, $Ge_3La_5$, $Ge_3La_4$, $Ge_4La_5$, GeLa, $Ge_5La_3$, $BaSe_2$, $Ba_2Se_3$, BaSe, ,PdSe, $Mo_3Se_4$, $MoSe_2$, $Ba_2Ge$, $BaGe_2$, BaGe, $Ba_2Te_3$, BaTe, $Ge_2Pd_5$, $GePd_2$, $Ge_9Pd_{25}$, GePd, $Ge_3Pt$, $Ge_3Pt_2$, GePt, $Ge_2Pt_3$, $GePt_2$, $GePt_3$, $Pu_3Sn$, $Pu_5Sn_3$, $Pu_5Sn_4$, $Pu_8Sn_7$, $Pu_7Sn_8$, $PuSn_2$, $PuSn_3$, $Pt_5Te_4$, $Pt_4Te_5$, $PtTe_2$, GeNi, $Ge_3Ni_5$, $Ge_2Ni_5$, $GeNi_3$, $NiTe_{0.85}$, $NiTe_{0.775}$, $Ni_{3\pm x}Te_x$, $Cr_{11}Ge_{19}$, CrGe, $Cr_{11}Ge_8$, $Cr_5Ge_3$, $Cr_3Ge$, $CrSi_2$, $Cr_5Si_3$, $Cr_3Si$, $Cr_5Te_8$, $Cr_4Te_5$, $Cr_3Te_4$, $Cr_{1-x}Te$, $Ge_3Mn_5$, $GeMn_2$, $Mn_6Si$, $Mn_9Si_2$, $Mn_3Si$, $Mn_5Si_2$, $Mn_5Si_3$, MnSi, $Mn_{11}Si_{19}$, $Mn_2Sn$, $Mn_{3.25}Sn$, MnTe, $Te_2W$, $FeGe_2$, $Fe_5Ge_3$, $Fe_3Ge$, $Fe_2Si$, $Fe_5Si_3$, FeSi, $FeSi_2$, $Ge_2Mo$, $Ge_{41}Mo_{23}$, $Ge_{16}Mo_9$, $Ge_{23}Mo_{13}$, $Ge_3Mo_5$, $GeMo_3$, $Mo_3Si$, $Mo_5Si_3$, $MoSi_2$, MoSn, $MoSn_2$, $Mo_3Te_4$, $MoTe_2$, $Si_2Ti$, SiTi, $Si_4Ti_5$, $Si_3Ti_5$, $SiTi_3$, $Sn_5Ti_6$, $Sn_3Ti_5$, $SnTi_2$, $SnTi_3$, $CoGe_2$, $Co_5Ge_7$, CoGe, $Co_5Ge_3$, $Co_4Ge$, $Co_3Te_4$, $Ge_7Re_3$, $Re_5Si_3$, ReSi, $ReSi_2$, $Re_2Te$.

Among them, a compound having a melting-point of 900° C. or higher is more desirable.

(b) When the melting-point of the phase-change component of the reflectivity adjustment layer is between 250° C. and 450° C., even if the high melting-point component is replaced with at least one of the following compounds or alloys, or a composition close to it, or at least one of a mixed composition thereof and compounds of 3 elements or more close to the mixed composition, the similar result is obtained.

A compound of the group G indicated above or the group H indicated below or a compound having a melting-point of 600° C. or higher <Group H>

$Cs_3Ge$, $Ba_2Tl$, $GePd_3$, $Fe_6Ge_5$, $FeTe_2$, $Co_5Ge2$, $Nd_3Pd$, $Cs_3Te_2$, $Ce_4Ir$, NaPd, $Ca_9Pd$, $Ca_3Pd_2$, $Ca_2Ge$, $Se_3Sr$, $Ce_3Tl$, $CeSe_2$, $Ce_3Ge$, $BaSe_3$, $GeSe_2$, GeSe, $BaTe_2$, $GePd_5$, $Ge_8Mn_{11}$, $MnTe_2$, $Ge_3W_2$, FeGe, $Fe_4Ge_3$, $Fe_3Sn$, $Fe_3Sn_2$, FeSn, $CoTe_2$ (c) When the melting-point of the phase-change component of the reflectivity adjustment layer is 250° C. or lower, even if the high melting-point component is replaced with at least one of the following compounds or alloys, or a composition close to it, or at least one of a mixed composition thereof and compounds of 3 elements or more close to the mixed composition, the similar result is obtained.

A compound of the group G or H indicated above or the group I indicated below or a compound having a melting-point of 400° C. or higher
<Group I>
$Ba_4Tl$, $CsTe$, $Ba_4Tl$, $Ba_{13}Tl$, $Cd_{11}Nd$, $Cd_6Nd$, $Cs_5Te_4$, $Ca_3Pd$, $Ca_5Pd_2$, $Sn_3Sr$, $Ba_{13}Tl$, $PdTl_2$, $FeSe_2$, $FeSe$, $Cr_2Te_3$, $CrTe_3$, $FeSn_2$ Embodiment 7

In the reflectivity adjustment layer, as to a combination of the high melting-point component and the phase-change component, a combination in which each component includes the same element such as Au—Sn and Sn—Ti has a satisfactory reading characteristic. However, when the amount of the same element is too large, the difference in the melting-point between both components is eliminated. Therefore, it is desirable that the amount of the same element is 80 atomic % or less in the component. When the amount of the same element is small, the refractive indexes of both components when they are not melted are often not equal to each other and the noise during reading is increased. Therefore, it is desirable that the amount of the same element is 30 atomic % or more.

When the high melting-point component and the low melting-point component of the reflectivity adjustment layer include 50 atomic % or more of a metal element or a semimetal element respectively, the thickness range of a recording film which can obtain a high reflectivity and a high modulation degree is extended to ±5 nm or more and disks can be manufactured easily.

Embodiment 8

When the high melting-point component content (atomic %) is changed using Au—Sn as a phase-change component in the reflectivity adjustment layer and Sn-Ti as a high melting-point component and the C/N value and the possible number of rewritings are examined, the following results are obtained.

| High melting-point component content (atomic %) | Possible number of rewritings (times) |
| --- | --- |
| 2 | 5 |
| 3 | 10 |
| 5 | 20 |
| ≧10 | ≧25 |

| High melting-point component content (%) | C/N (dB) |
| --- | --- |
| ≦30 | ≦48 |
| 40 | 48 |
| 50 | 46 |
| 60 | 42 |

The above table shows that it is desirable that the high melting-point component content is within a range from 10% to 50% and more desirable that it is within a range from 20% to 40%. However, even if no high melting-point component is included, about 50 times of rewritings which are 5 times of the conventional value are possible. A high melting-point component deposited in the reflectivity adjustment layer is not always limited to Sn—Ti but Ti may be deposited.

It is desirable that the content of oxide, sulfide, nitride, and carbide in a high melting-point component is less than 50% of the high melting-point component and particularly desirable that it is less than 20%. When the content of these compounds is high, a problem easily arises that the difference in the complex refractive index between the high melting-point component and the phase-change component cannot be reduced or oxygen is diffused into the phase-change component and the writing characteristic is degraded.

Embodiment 9

Since the melting-point of the reflectivity adjustment layer varies with the material of the reflectivity adjustment layer, when the optimum rewriting power is examined by changing the composition of the phase-change component, the following results are obtained. Sn—Ti is used as a high melting-point component.

| Composition of phase-change component in film | Melting point of film (°C.) | Rewriting power (mW) |
| --- | --- | --- |
| $Au_{70}Sn_{30}$ | 250 | 3 |
| $In_2Te_5$ | 450 | 6 |

It is desirable that the melting-point of the reflectivity adjustment layer is low because the power for rewriting is low.

Embodiment 10

In the disk described in Embodiment 1, when the composition of the recording film is changed as shown below, the amount of variation $\Delta k'$ of the damping coefficient k before and after illumination of the laser beam is changed. When a written mark with a length which is about 25% of the diameter of a laser beam spot is formed on disks having these recording films and the C/N value of the reproduced signal is compared, the following results are obtained.

| Film composition | C/N of reproduced signal |
| --- | --- |
| $(Cr_4Te_5)_{80}(Ge_{46}Te_{46}Se_8)_{20}$ | 37 dB |
| $(Cr_4Te_5)_{60}(Ge_{46}Te_{46}Se_8)_{40}$ | 42 dB |
| $(Cr_4Te_5)_{40}(Ge_{46}Te_{46}Se_8)_{60}$ | 46 dB |
| $(Cr_4Te_5)_{20}(Ge_{46}Te_{46}Se_8)_{80}$ | 48 dB |

The above table shows that it is desirable that the content of $Cr_4Te_5$ when $20\% \leq \Delta k'$ is 40% or less. When the content of $Cr_4Te_5$ is set to 20% or higher, a possible number of rewritings of 300 times or more is obtained and when the content is set to 10% or higher, a possible number of rewritings of 100 times or more is obtained. However, even if $Cr_4Te_5$ is not included, about 50 times of rewritings which are 5 times of the conventional value are possible. A high melting-point component deposited in the recording layer is not always limited to $Cr_4Te_5$ but Cr or $Cr_3Ge$ may be deposited. The recording layer composition range in this embodiment is a composition range in which a satisfactory characteristic can be obtained even if no reflectivity adjustment layer is used or the reflectivity adjustment layer is replaced with a high melting-point metal layer such as Au.

Embodiment 11

When a high melting-point component is put into the recording layer, the possible number of rewritings is improved. A difference in the possible number of rewritings due to the difference ($\Delta$m.p=melting-point of high melting-point component—melting-point of phase-change component) in the melting-point in the recording layer at this time is examined. In this case, the high melting-point component is changed by using $GeSb_2Te_4$ as a phase-change component.

| High melting-point component | $\Delta$m.p (°C.) | S/N after 10 times of rewritings |
|---|---|---|
| $Pt_3Sb$ | 50 | 15 dB |
| $Mo_3Sb_7$ | 150 | 20 dB |
| $CoSb_3$ | 200 | 22 dB |
| $Cr_4Te_5$ | $\geq$300 | 25 dB |

The above table shows that a range of $\Delta$m.p>150 is desirable.

The combination of the phase-change component and the high melting-point component and the difference in melting-point between them described in this embodiment are also effective for a case that no reflectivity adjustment layer is used and a case that the reflectivity adjustment layer is replaced with a high melting-point metal layer such as Au.

Embodiment 12

In the recording layer, as to a combination of the high melting-point component and the phase-change component, a combination in which each component includes the same element such as $Cr_4Te_5$ and $GeSb_2Te_4$ has a satisfactory reading characteristic. However, when the amount of the same element is too large, the difference in the melting-point between both components is eliminated. Therefore, it is desirable that the amount of the same element is 80 atomic % or less in the component. When the amount of the same element is small, the refractive indexes of both components when they are not melted are often not equal to each other and the noise during reading is increased. Therefore, it is desirable that the amount of the same element is 30 atomic % or more.

Embodiment 13

Even if the recording film 26 in the aforementioned embodiment 1 is changed to the material of the mean composition expressed by the aforementioned general formula (4), for example, $Se_{51}In_{40}Cr_9$ (high melting-point component $Cr_3Se_4$, phase-change component InSe), the same result is obtained. However, the ranges of p, q, r, and s given in the aforementioned general formula (4) when the possible number of readings is $2\times10^6$ or more and the C/N value of the reproduced signal after $10^5$ times of rewritings is 46 dB or more are $40\leq p\leq 95$, $0\leq q\leq 55$, $5\leq r\leq 50$, and $0\leq s\leq 20$. The more desirable ranges when the C/N value is 48 dB or more are $50\leq p\leq 80$, $0\leq q\leq 40$, $10\leq r\leq 40$, and $0\leq s\leq 10$. This composition can be used also for a phase-change film of a recording medium using no reflectivity adjustment layer or a recording medium in which the reflectivity adjustment layer is replaced with a high melting-point metal layer such as Au.

In each of the aforementioned embodiments 2 to 12, the desirable melting-point and shape of the high melting-point component, the desirable protective film, reflection film, and substrate material, and the rewriting apparatus are the same as those in other embodiments in which they are described.

Embodiment 14

Even if the recording film including Se—In—Cr in the aforementioned embodiment 13 is changed to the material of the mean composition expressed by the aforementioned general formula (2) such as Se—In—Si, Se—In—Ag, Se—In—Al, Se—In—Ba, Se—In—Ca, Se—In—Cd, Se—In—Co, Se—In—Cu, Se—In—Mg, Se—In—Mn, Se—In—Mo, Se—In—Ni, Se—In—Pd, Se—In—Pt, Se—In—Ta, Se—In—Ti, Se—In—V, Se—In—W, Se—In—Y, Se—In—Pb, Se—Sb—Si, Se—Sb—Ag, Se—Sb—Al, Se—Sb—Ba, Se—Sb—Ca, Se—Sb—Cd, Se—Sb—Co, Se—Sb—Cr, Se—Sb—Cu, Se—Sb—Mg, Se—Sb—Mn, Se—Sb—Mo, Se—Sb—Ni, Se—Sb—Pd, Se—Sb—Pt, Se—Sb—Ta, Se—Sb—Ti, Se—Sb—V, Se—Sb—W, Se—Sb—Y, Se—Sb—Pb, Se—Bi—Si, Se—Bi—Ag, Se—Bi—Al, Se—Bi—Ba, Se—Bi—Ca, Se—Bi—Cd, Se—Bi—Co, Se—Bi—Cr, Se—Bi—Cu, Se—Bi—Mg, Se—Bi—Mn, Se—Bi—Mo, Se—Bi—Ni, Se—Bi—Pd, Se—Bi—Pt, Se—Bi—Ta, Se—Bi—Ti, Se—Bi—V, Se—Bi—W, Se—Bi—Y, Se—Bi—Pb, Se—Sn—Si, Se—Sn—Ag, Se—Sn—Al, Se—Sn—Ba, Se—Sn—Ca, Se—Sn—Cd, Se—Sn—Co, Se—Sn—Cr, Se—Sn—Cu, Se—Sn—Mg, Se—Sn—Mn, Se—Sn—Mo, Se—Sn—Ni, Se—Sn—Pd, Se—Sn—Pt, Se—Sn—Ta, Se—Sn—Ti, Se—Sn—V, Se—Sn—W, Se—Sn—Y, Se—Sn—Pb, Se—Te—Si, Se—Te—Ag, Se—Te—Al, Se—Te—Ba, Se—Te—Ca, Se—Te—Cd, Se—Te—Co, Se—Te—Cr, Se—Te—Cu, Se—Te—Mg, Se—Te—Mn, Se—Te—Mo, Se—Te—Ni, Se—Te—Pd, Se—Te—Pt, Se—Te—Ta, Se—Te—Ti, Se—Te—V, Se—Te—W, Se—Te—Y, Se—Te—Pb, Se—Au—Si, Se—Au—Ag, Se—Au—Al, Se—Au—Ba, Se—Au—Ca, Se—Au—Cd, Se—Au—Co, Se—Au—Cr, Se—Au—Cu, Se—Au—Mg, Se—Au—Mn, Se—Au—Mo, Se—Au—Ni, Se—Au—Pd, Se—Au—Pt, Se—Au—Ta, Se—Au—Ti, Se—Au—V, Se—Au—W, Se—Au—Y, Se—Au—Pb, Se—B—Si, Se—B—Ag, Se—B—Al, Se—B—Ba, Se—B—Ca, Se—B—Cd, Se—B—Co, Se—B—Cr, Se—B—Cu, Se—B—Mg, Se—B—Mn, Se—B—Mo, Se—B—Ni, Se—B-Pd, Se—B-Pt, Se—B—Ta, Se—B—Ti, Se—B—V, Se—B—W, Se—B—Y, Se—B—Pb, Se—Cs—Si, Se—Cs—Ag, Se—Cs—Al, Se—Cs—Ba, Se—Cs—Ca, Se—Cs—Cd, Se—Cs—Co, Se—Cs—Cr, Se—Cs—Cu, Se—Cs—Mg, Se—Cs—Mn, Se—Cs—Mo, Se—Cs—Ni, Se—Cs—Pd, Se—Cs—Pt, Se—Cs—Ta, Se—Cs—Ti, Se—Cs—V, Se—Cs—W, Se—Cs—Y, Se—Cs—Pb, Se—tl—Si, Se—Tl—Ag, Se—Tl—Al, Se—tl—Ba, Se—Tl—Ca, Se—Tl—Cd, Se—Tl—Co, Se—Tl—Cr, Se—Tl—Cu, Se—Tl—Mg, Se—Tl—Mn, Se—Tl—Mo, Se—Tl—Ni, Se—Tl—Pd, Se—Tl—Pt, Se—Tl—Ta, Se—Tl—Ti, Se—Tl—V, Se—Tl—W, Se—Tl—Y, Se—Tl—Pb, Se—S—Si,Se—S—Ag, Se—S—Al, Se—S—Ba, Se—S—Ca, Se—S—Cd, Se—S—Co, Se—S—Cr, Se—S—Cu, Se—S—Mg, Se—S—Mn, Se—S—Mo, Se—S—Ni, Se—S—Pd, Se—S—Pt, Se—S—Ta, Se—S—Ti, Se—S—V, Se—S—W, Se—S—Y, Se—S—Pb, Se—Ge—Si, Se—Ge—Ag, Se—Ge—Al, Se—Ge—Ba, Se—Ge—Ca, Se—Ge—Cd, Se—Ge—Co, Se—Ge—Cr, Se—Ge—Cu, Se—Ge—Mg, Se—Ge—Mn, Se—Ge—Mo, Se—Ge—Ni, Se—Ge—Pd, Se—Ge—Pt, Se—Ge—Ta, Se—Ge—Ti, Se—Ge—V, Se—Ge—W, Se—Ge—Y, Se—Ge—Pb, Se—Fe—Si, Se—Fe—Ag, Se—Fe—Al, Se—Fe—Ba, Se—Fe—Ca, Se—Fe—Cd, Se—Fe—Co, Se—Fe—Cr, Se—Fe—Cu, Se—Fe—Mg, Se—Fe—Mn, Se—Fe—Mo, Se—Fe—Ni, Se—Fe—Pd, Se—Fe—Pt, Se—Fe—Ta, Se—Fe—Ti, Se—Fe—V, Se—Fe—W, Se—Fe—Y, Se—Fe—Pb, Se—Zn—Si,Se—Zn—Ag, Se—Zn—Al, Se—Zn—Ba, Se—Zn—Ca, Se—Zn—Cd, Se—Zn—Co, Se—Zn—Cr, Se—Zn—Cu, Se—Zn—Mg, Se—Zn—Mn, Se—Zn—Mo, Se—Zn—Ni, Se—Zn—Pd, Se—Zn—Pt, Se—Zn—Ta, Se—Zn—Ti, Se—Zn—V, Se—Zn—W, Se—Zn—Y, or Se—Zn—Pb, the same result is obtained. Among them, the materials from Se—In—Si to Se—Sn—Pb are particularly desirable because a high reflectivity and a satisfactory recording (overwriting) characteristic can be easily obtained. These compositions can be used also for a phase-change film of a recording medium using no reflectivity adjustment layer or a recording medium in which the reflectivity adjustment layer is replaced with a high melting-point metal layer such as Au.

Embodiment 15

The information writing apparatus to an optical recording medium described in this embodiment uses fhe information recording medium described in Embodiment 1 and comprises a means for rotating the information recording medium in the apparatus, a laser driving means for generating a laser power modulated waveform changing according to an information signal between the recording power level and the erase power level, a means for focusing a laser beam on the recording medium, and a means for setting the laser power so that the optical constant of the reflectivity adjustment layer of the optical recording medium changes greatly in at least a part of the rewriting time when information is rewritten by overwriting.

By doing this, even if a recording medium having a high reflectivity is used for reading at a low laser power, a fine written mark is formed when information is rewritten by overwriting and the information is recorded in high density and a high sensitivity can be obtained.

Embodiment 16

The information writing apparatus to an optical recording medium described in this embodiment uses in information recording medium having a property that the reflectivity is changed suddenly at the predetermined laser power such as described in Embodiment 1 and comprises a means for rotating the information recording medium in the apparatus, a laser driving means for generating a laser power modulated waveform changing according to an information signal between the recording power level and the erase power level, a means for focusing a laser beam on the recording medium, and a means for setting the power ratio of the recording power level to the erase power level to a value less than 2, to 1 when information is rewritten by overwriting.

By doing this, although the reflectivity adjustment layer is melted and the area where the reflectivity is reduced is wider when the recording power level is used compared with that when the erase power level is used, an optimum temperature to recording (noncrystallization) and erasing (cry s tallization) can be obtained.

Embodiment 17

The information writing apparatus to an optical recording medium described in this embodiment uses an information recording medium having a property that the reflectivity is changed suddenly at the predetermined laser power such as described in Embodiment 1 and comprises a means for rotating the information recording medium in the apparatus, a laser driving means for generating a laser power modulated waveform changing according to an information signal between the recording power level and the erase power level, a means for focusing a laser beam on the recording medium, and a means for setting the output of the laser beam to an output at which the whole film is not melted even in the area where the temperature of the reflectivity adjustment layer is maximized.

By preventing the high melting-point component in the reflectivity adjustment layer from melting like this, the flow of the reflectivity adjustment layer is prevented and a practical possible number of rewritings can be obtained.

Embodiment 18

The information reading apparatus from an optical recording medium described in this embodiment has a means for setting the read laser power to an intermediate value between the laser power at which the information recorded on the optical recording medium is changed while a laser beam spot passes on the optical recording medium once and the laser power at which the optical constant of the reflectivity adjustment layer changes greatly when it reads information from an optical recording medium having a particularly high recording density.

By doing this, the reading light from a portion where the optical constant of the reflectivity adjustment layer is changed due to temperature rise becomes weak, so that a written mark recorded in high density is read at a high resolution and a great reproduced signal can be obtained.

Embodiment 19

In the apparatus of this embodiment, to obtain a satisfactory rewriting characteristic, the relationship between the laser power Pr for tracking, automatic focusing, and reading and the laser power Pe for rewriting is kept as expressed by the following formula.

$Pe/Pr > 2$

Embodiment 20

In the apparatus of this embodiment, to keep the high melting-point component in the solid phase without the whole film being melted even in the area where the temperature of the reflectivity adjustment layer is maximized, a disorder of the reflected light intensity distribution of the return light is detected and analyzed by the optical intensity distribution analysis circuit at the time of illumination at a high laser power and a circuit for adjusting the laser power according to the magnitude of disorder is incorporated in the laser power setting circuit. By doing this, the reflectivity adjustment layer is not degraded easily.

The aforementioned disorder of the optical intensity distribution means a change with time of disorder of the optical intensity distribution, that is, a change with time of the ratio of output of each detector. To detect disorder of the optical intensity distribution, two or more detectors are arranged one-dimensionally or two-dimensionally almost in parallel with the surface of a recording medium and the output of each detector is connected to the optical intensity distribution analysis circuit.

Embodiment 21

In the apparatus of this embodiment, the ratio occupied by the melting portion of the reflectivity adjustment layer in the laser beam spot is different between illumination on the recording power level and illumination on the erase power level at the time of rewriting by overwriting. Therefore, when a disk using no reflectivity adjustment layer is used, it is appropriate that the power ratio of the recording power level to the erase power level is 2 or a value larger than 2 to 1. However, in this embodiment, when the ratio is a value between 1.5 and 1.8 to 1, a satisfactory overwriting characteristic is obtained. Namely, a large erase ratio can be obtained. When the ratio is within a range from 1.7 to 1 to 1.3 to 1, it is particularly satisfactory.

Embodiment 22

Using an $Au_{80}Si_{20}$ film in place of the $Au_{56}Sn_{31}Ti_{13}$ film of the reflectivity adjustment layer described in Embodiment 1, a disk is prepared under the same condition except it. Also this disk satisfies the requirements of reflectivity and reproduced signal modulation degree, and the recording laser power is 17 mW, and the possible number of rewritings is 10 times.

As explained above, according to the present invention, a superior information recording medium and recording/reproducing apparatus which can read data by a CD, a CD-ROM, or an optical video disk device, and can record it in high sensitivity and in high density, and rewrite it can be obtained.

The effects of the present invention will be explained hereunder more in detail.

In the information recording medium of the present invention, when a high-power laser beam is illuminated at the time of recording (overwriting), at least one of the real part (refractive index n) and the imaginary part (extinction coefficient k) of the complex refractive index at the high-temperature portion in the laser beam spot is changed from that before illumination, so that the reflectivity in the high temperature portion in the laser beam spot is reduced. As a result, data can be recorded at a low laser power. This effect is valid even when a general rewritable phase-change disk in which the reflectivity at the time of illumination of weak light is reduced to less than 60% by changing the thickness of one of the layers is used. The effect is valid particularly when the recording sensitivity is apt to reduce such as when Si having a low light absorptivity is used for the light reflection layer or for a use requiring recording at a high linear velocity, such as, for example, an optical video disk.

When a particularly desirable change occurs in the refractive index, the light absorptivity in the area (for example, the crystalline area) having a high reflectivity becomes larger than the light absorptivity in the area (for example, the amorphous area) having a low reflectivity. By doing this, when data is rewritten by overwriting, a distortion in the shape of a written mark newly formed which is caused by that the temperature at the location where an amorphous written mark exists previously becomes higher than the temperature at the other locations can be prevented. When a secondarily desirable change occurs in the refractive index, the light absorptivities in both areas become equal to each other. In this case, the temperature in the amorphous area is a little higher than that in the crystalline area because the thermal conductivity in the crystalline area is higher than that in the amorphous area. When a high melting-point component having a melting-point which is relatively higher than that of the phase-change component is deposited in the reflectivity adjustment layer or the recording layer, the flow and segregation when the film is melted by illumination of a laser beam are prevented effectively. As a result, data can be rewritten more times than conventional with the satisfactory characteristic kept.

The light absorbing area which is an area satisfying both conditions that it is in an area where the reflectivity adjustment layer is melted and the reflectivity is reduced and it is in the laser beam spot is a part of the laser beam spot, so that the temperature rising area of the recording layer is reduced, and a fine written mark is formed reproducibly, and data can be recorded easily in high density. This effect is valid even when a general rewritable phase-change disk in which the reflectivity at the time of illumination of weak light is reduced to less than 60% by changing the thickness of one of the layers is used.

According to the present invention, enlargement or reduction of the melted area of the reflectivity adjustment layer operates synergetically for increasing or decreasing of the laser beam power, so that the temperature of the recording film rises or lowers steeply and it is desirable to obtain a reproduced signal faithful to a recorded signal. This effect is also valid even when a general rewritable phase-change disk in which the reflectivity at the time of illumination of weak light is reduced to less than 60% by changing the thickness of one of the layers is used.

What is claimed is:

1. An optical recording medium which is formed on a substrate directly or via a protective layer and records and reads information by a change in a recording layer which is caused by irradiation of a laser beam, wherein said optical recording medium has a reflectivity adjustment layer separate from the recording layer, and the optical constants of the reflectivity adjustment layer are changed by irradiation of light and the reflectivity at the time or irradiation of weak light is relatively higher than the reflectivity at the time of irradiation of strong light, wherein the reflectivity adjustment layer is expressed by the general formula $A_eB_fC_g$, in which A indicates at least one element selected from the group consisting of Sn, Pb, Bi, Zn, Ga, and In, B indicates at least one element selected from the group consisting of As, B, C, N, O, S, Se, Si, Te, Ag, Al, Au, Ba, Be, Ca, Cd, Co, Cr, Cs, Cu, Fe, Ge, Hf, Hg, Ir, K, Li, Mg, Mn, Mo, Na, Nb, Ni, Os, Pd, Pt, Rb, Re, Rh, Ru, Sb, Sc, Sr, Ta, Ti, V, W, Y, and Zr, and C indicates at least one element from the group consisting of Tl, Br, Cl, F, H, I and P, and wherein e, f, and g are atomic percents with $30 \leq e \leq 95$, $5 \leq f \leq 50$, and $0 \leq g \leq 20$.

2. An optical recording medium according to claim 1, wherein the reflectivity at a portion having a high reflectivity on the recording track is 60% or higher at the time of irradiation of weak light and the reflectivity at the same portion is 40% or lower at the time of irradiation of strong light.

3. An optical recording medium according to claim 1, wherein the reflectivity at a portion having a high reflectivity on the recording track is 60% or higher at the time of irradiation of weak light, and the reflectivity at the same portion is 40% or lower at the time of irradiation of strong light, and the reflectivity when information is read by a compact disk player, or a CD-ROM drive, or an optical video disk drive is 60% or higher.

4. An optical recording medium according to claim 1 or 2, wherein said reflectivity adjustment layer has a melting-point which is lower than that of said recording layer by 250° C. or more.

5. An optical recording medium according to claim 1 or 2, wherein the melting-point of said reflectivity adjustment layer is 450° C. or lower.

6. An optical recording medium according to claim 1 or 2, wherein said reflectivity adjustment layer has an eutectic alloy composition in which the quantity of each element may vary within a range of ±10 atomic percent from its stoichiometric quantity in said composition.

7. An optical recording medium according to claim 6, wherein said reflectivity adjustment layer has an eutectic alloy composition including at least one of Au, Ag, and Al.

8. An optical recording medium according to claim 7, wherein said reflectivity adjustment layer has a composition of one of alloys of Au—Sn, Au—Sb, Au—Ge, Au—Si, Au—In, Au—Ga, Ag—Sn, Ag—Ge, and Ag—In and mixtures thereof.

9. An optical recording medium according to claim 1 or 2, wherein said reflectivity adjustment layer exists on the side opposite to the reflection layer taking the recording layer as a base.

10. An optical recording medium according to claim 1, wherein a reflectivity adjustment layer, a protective layer, a recording layer, an intermediate layer, and a reflection layer are laminated in this order from the substrate side directly on the substrate or via another layer.

11. An optical recording medium according to claim 1 or 2, wherein at least one of the real part and the imaginary part of the complex refractive index of said reflectivity adjustment layer is changed by irradiation of light by 20% or more of that before irradiation.

12. An optical recording medium according to claim 1 or 2, wherein at least one of said reflectivity adjustment layer and said recording layer includes a deposit comprising a high melting-point component which is relatively higher in the melting-point than the residual component of said layer.

13. An optical recording medium according to claim 12, wherein a difference between the melting-point of said high melting-point component and the melting-point of the residual component of said thin film is 150° C. or higher.

14. An optical recording medium according to claim 13, wherein the melting-point of the residual component of said recording layer is 750° C. or lower.

15. An optical recording medium according to claim 12, wherein the melting-point of said high melting-point component included in said reflectivity adjustment layer is 600° C. or higher.

16. An optical recording medium according to claim 15, wherein the melting-point of the residual component of said reflectivity adjustment layer is 450° C. or lower.

17. An optical recording medium according to claim 12, wherein the melting-point of said high melting-point component included in said recording layer is 800° C. or higher.

18. An optical recording medium according to claim 12, wherein precipitates of said high melting-point component are distributed like grains or pillars inside said thin film.

19. An optical recording medium according to claim 18, wherein precipitates of said high melting-point component are extended like a pillar in the direction of the film thickness from the interfaces on both sides of said thin film and the length of said precipitates in the direction of the film thickness is longer than 5 nm and shorter than a half of the thickness of said thin film.

20. An optical recording medium according to claim 19, wherein the length of a straight line connecting the centers of two neighboring precipitates of said high melting-point component which passes through the area between said precipitates in the direction of the surface of said thin film is within a range from 15 nm to 70 nm.

21. An optical recording medium according to claim 18, wherein precipitates of said high melting-point component are extended like a pillar in the direction of the film thickness from the interface on one side of said thin film and the length of said precipitates in the direction of the film thickness is 10 nm or longer or equal to the thickness of said thin film or shorter.

22. An optical recording medium according to claim 21, wherein the length of a straight line connecting the centers of two neighboring precipitates of said high melting-point component which passes through the area between said precipitates in the direction of the surface of said thin film is within a range from 15 nm to 70 nm.

23. An optical recording medium according to claim 18, wherein the length of a straight line connecting the centers of two neighboring precipitates of said high melting-point component which passes through the area between said precipitates in the direction of the surface of said thin film is within a range from 15 nm to 70 nm.

24. An optical recording medium according to claim 12, wherein the maximum external dimension of precipitates of said high melting-point component is within a range from 5 nm to 50 nm.

25. An optical recording medium according to claim 24, wherein precipitates of said high melting-point component are extended like a pillar in the direction of the film thickness from the interfaces on both sides of said thin film and the length of said precipitates in the direction of the film thickness is longer than 5 nm and shorter than a half of the thickness of said thin film.

26. An optical recording medium according to claim 24, wherein precipitates of said high melting-point component are extended like a pillar in the direction of the film thickness from the interface on one side of said thin film and the length of said precipitates in the direction of the film thickness is 10 nm or longer or equal to the thickness of said thin film or shorter.

27. An optical recording medium according to claim 24, wherein the length of a straight line connecting the centers of two neighboring precipitates of said high melting-point component which passes through the area between said precipitates in the direction of the surface of said thin film is within a range from 15 nm to 70 nm.

28. An optical recording medium according to claim 12, wherein when the mean composition of said reflectivity adjustment layer is expressed by the formula:

$$L_j H_k$$

using a low melting-point component L of an individual element, a compound, or a mixture composition and a high melting-point component H of an individual element or a compound composition, the content of each element in the film is within a range of the value decided by the above formula ±10 atomic % on condition that a composition of the above formula, where $0.2 \leq k/(j+k) \leq 0.4$, is a reference composition.

29. An optical recording medium according to claim 12, wherein both the low melting-point component and the high melting-point component of said reflectivity adjustment layer include 50 atomic % or more of a metal element or a semimetal element.

30. An optical recording medium according to claim 12, wherein the high melting-point component included in said reflectivity adjustment layer is a compound of a transition metal and at least one element selected from a group of Sn and Pb.

31. An optical recording medium according to claim 12, wherein the melting-point of the residual component of said reflectivity adjustment layer is 450° C. or lower.

32. An optical recording medium according to claim 12, wherein the residual component of said reflectivity adjustment layer is an alloy of at least one element selected from a group of Au and Ag and at least one element selected from a group of Sn, Ge, Si, In, and Ga.

33. An optical recording medium according to claim 12, wherein when the mean composition of said recording layer is expressed by the formula:

$$L_j H_k$$

using a low melting-point component L of an individual element, a compound, or a mixture composition and a high melting-point component H of an individual element or a compound composition, the content of each element in the film is within a range of the value decided by the above formula ±10 atomic % on condition that a composition of the above formula, where $0.2 \leq k/(j+k) \leq 0.4$, is a reference composition.

34. An optical recording medium according to claim 12, wherein the high melting-point component included in said recording layer is a compound of Te and at least one element selected from a group of Cr and Ag.

35. An optical recording medium according to claim 12, wherein the melting-point of the residual component of said recording layer is 750° C. or lower.

36. An optical recording medium according to claim 12, wherein the main components of said recording layer are comprised of Ge and Te or comprised of Se and at least one element selected from a group of In and Sb.

37. An optical recording medium according to claim 1 or 2, wherein the main components of said recording layer are comprised of Ge and Te or comprised of Se and at least one element selected from a group of In and Sb.

38. An optical recording medium according to claim 1 or 2, wherein when information is rewritten by overwriting, the information for setting the power ratio of the recording power level to the erase power level at a value less than 2 to 1 is written on said optical recording medium.

39. An optical recording medium according to claim 1 or 2, wherein said recording medium has a property that when a high-power laser beam is irradiated, the reflectivity reduces greatly and when the power of the laser beam is lowered, the reflectivity returns to a high value, and the information for setting the laser power so that the optical constants of the reflectivity adjustment layer of the optical recording medium change greatly in at least a part of the rewriting time when information is rewritten is written on said optical recording medium.

40. An optical recording medium according to claim 1 or 2, wherein the information for setting the output of the laser beam to an output at which the whole film is not melted even in the area of the reflectivity adjustment layer of the optical recording medium where the temperature is highest is written on said optical recording medium.

41. An optical recording medium having a property that when a high-power laser beam is irradiated, the reflectivity reduces greatly and when the power of the laser beam is lowered, the reflectivity returns to a high value, wherein the information for setting the read laser power to an intermediate value between the laser power at which the information recorded on said optical recording medium changes while a laser beam spot passes on said optical recording medium once and the lowest laser power down to which the reflectivity of said optical recording medium changes to a low value is written on said optical recording medium, said optical recording medium having a reflectivity adjustment layer expressed by the general formula $A_eB_fC_g$, in which A indicates at least one element selected from the group consisting of Sn, Pb, Bi, Zn, Ga, and In, B indicates at least one element selected from the sroup consisting of As, B, C, N, O, S, Se, Si, Te, Ag, Al, Au, Ba, Be, Ca, Cd, Co, Cr, Cs, Cu, Fe, Ge, Hf, Hg, Ir, K, Li, Mg, Mn, Mo, Na, Nb, Ni, Os, Pd, Pt, Rb, Re, Rh, Ru, Sb, Sc, Sr, Ta, Ti, V, W, Y, and Zr, and C indicates at least one element from the group consisting of Tl, Br, Cl, F, H, I and P, and wherein e, f, and g are atomic percents with $30 \leq e \leq 95$, $5 \leq f \leq 50$, and $0 \leq g \leq 20$.

42. An optical recording medium having a property that when a high-power laser beam is irradiated, the reflectivity reduces greatly and when the power of the laser beam is lowered, the reflectivity returns to a high value, wherein the information for setting the read laser power at a value lower than the lowest laser power down to which the reflectivity of said optical recording medium changes to a low value is written on said optical recording medium, said optical recording medium having a reflectivity adjustment layer expressed by the general formula $A_eB_fC_g$, in which A indicates at least one element selected from the group consisting of Sn, Pb, Bi, Zn, Ga, and In, B indicates at least one element selected from the group consisting of As, B, C, N, O, S, Se, Si, Te, Ag, Al, Au, Ba, Be, Ca, Cd, Co, Cr, Cs, Cu, Fe, Ge, Hf, Hg, Ir, K, Li, Mg, Mn, Mo, Na, Nb, Ni, Os, Pd, Pt, Rb, Re, Rh, Ru, Sb, Sc, Sr, Ta, Ti, V, W, Y, and Zr, and C indicates at least one element from the group consisting of Tl, Br, Cl, F, H, I and P, and wherein e, f, and g are atomic percents with $30 \leq e \leq 95$, $5 \leq f \leq 50$, and $0 \leq g \leq 20$.

43. An optical recording medium having a property that when a high-power laser beam is irradiated, the reflectivity reduces greatly and when the power of the laser beam is lowered, the reflectivity returns to a high value, wherein said recording medium includes a test-writing zone partially, said optical recording medium having a reflectiyity adjustment layer expressed bv the general formula $A_eB_fC_g$, in which A indicates at least one element selected from the group consisting of Sn, Pb, Bi, Zn, Ga, and In, B indicates at least one element selected from the group consisting of As, B, C, N, O, S, Se, Si, Te, Ag, Al, Au, Ba, Be, Ca, Cd, Co, Cr, Cs, Cu, Fe, Ge, Hf, Hg, Ir, K, Li, Mg, Mn, Mo, Na, Nb, Ni, Os, Pd, Pt, Rb, Re, Rh, Ru, Sb, Sc, Sr, Ta, Ti, V, W, Y, and Zr, and C indicates at least one element from the group consisting of Tl, Br, Cl, F, H, I and P, and wherein e, f, and g are atomic percents with $30 \leq e \leq 95$, $5 \leq f \leq 50$, and $0 \leq g \leq 20$.

44. An optical recording medium which is formed on a substrate directly or via a protective layer and records and reads information by a change in a recording layer which is caused by irradiation of a laser beam, wherein said optical recording medium has a reflectivity adjustment layer separate from the recording layer, and the optical constants of the reflectivity adjustment layer are changed by irradiation of light and the reflectivity at the time or irradiation of weak light is relatively higher than the reflectivity at the time of irradiation of strong light, wherein 80% or more of said reflectivity adjustment layer comprises a metallic element having a melting-point of 450° or lower or at least two kinds of metals having a melting-point of 400° or lower.

45. An optical recording medium according to claim 44, wherein the reflectivity at a portion having a high reflectivity on the recording track is 60% higher at the time of irradiation of weak light and the reflectivity at the same portion is 40% or lower at the time of irradiation of strong light.

46. An optical recording medium which is formed on a substrate directly or via a protective layer and records and reads information by a change in a recording layer which is caused by irradiation of a laser beam, wherein said optical recording medium has a reflectivity adjustment layer separate from the recording layer, and the optical constants of the reflectivity adjustment layer are changed by irradiation of light and the reflectivity at the time or irradiation of weak light is relatively higher than the reflectivity at the time of irradiation of strong light, wherein the reflectivity adjustment layer is expressed by the general formula $A_eB_fC_g$, in which A indicates at least one element selected from the group consisting of Sn, Pb, Bi, Zn, Ga, and In, B indicates at least one element selected from the group consisting of As, B, C, N, O, S, Se, Si, Te, Ag, Al, Au, Ba, Be, Ca, Cd, Co, Cr, Cs, Cu, Fe, Ge, Hf, Hg, Ir, K, Li, Mg, Mn, Mo, Na, Nb, Ni, Os, Pd, Pt, Rb, Re, Rh, Ru, Sb, Sc, Sr, Ta, Ti, V, W, Y, and Zr, and C indicates at least one element from the group consisting of Tl, Br, Cl, F, H, I and P, and wherein e, f, and g are atomic percents with $30 \leq e \leq 95$, $5 \leq f \leq 50$, and $0 \leq g \leq 20$, and said reflectivity adjustment layer exists between the recording layer and a reflection layer.

47. An optical recording medium according to claim 46, wherein the reflectivity at a portion having a high reflectivity on the recording track is 60% or higher at the time of irradiation of weak light and the reflectivity at he same portion is 40% or lower at the time of irradiation of strong light.

48. An optical recording medium which is formed on a substrate directly or via a protective layer and records and reads information by a change in a recording layer which is caused by irradiation of a laser beam, wherein said optical recording medium has a reflectivity adjustment layer separate from the recording layer, and the optical constants of the reflectivity adjustment layer are changed by irradiation of light and the reflectivity at the time or irradiation of weak light is relatively higher than the reflectivity at the time of irradiation of strong light, wherein the reflectivity adjustment layer is expressed by the general formula $A_e B_f C_g$, in which A indicates at least one element selected from the group consisting of Sn, Pb, Bi, Zn, Ga, and In, B indicates at least one element selected from the group consisting of As, B, C, N, O, S, Se, Si, Te, Ag, Al, Au, Ba, Be, Ca, Cd, Co, Cr, Cs, Cu, Fe, Ge, Hf, Hg, Ir, K, Li, Mg, Mn, Mo, Na, Nb, Ni, Os, Pd, Pt, Rb, Re, Rh, Ru, Sb, Sc, Sr, Ta, Ti, V, W, Y, and Zr, and C indicates at least one element from the group consisting of Tl, Br, Cl, F, H, I and P, and wherein e, f, and g are atomic percents with $30 \leq e \leq 95$, $5 \leq f \leq 50$, and $0 \leq g \leq 20$, and at least one of said reflectivity adjustment layer and said recording layer includes a deposit comprising a high melting-point component which is relatively higher in the melting-point than the residual component of said layer, and the total amount of atoms of the high melting-point component is 5 to 40% with respect to the total number of atoms of constituent elements in that layer.

49. An optical recording medium according to claim 48, wherein the reflectivity at the portion having a high reflectivity on the recording track is 60% or higher at the time of irradiation of weak light and the reflectivity at the same portion is 40% or lower at the time or irradiation of strong light.

50. An optical recording medium which is formed on a substrate directly or via a protective layer and records and reads information by a change in a recording layer which is caused by irradiation of a laser beam, wherein said optical recording medium has a reflectivity adjustment layer separate from the recording layer, and the optical constants of the reflectivity adjustment layer are changed by irradiation of light and the reflectivity at the time or irradiation of weak light is relatively higher than the reflectivity at the time of irradiation of strong light, wherein the reflectivity adjustment layer is expressed by the general formula $A_e B_f C_g$, in which A indicates at least one element selected from the group consisting of Sn, Pb, Bi, Zn, Ga, and In, B indicates at least one element selected from the group consisting of As, B, C, N, O, S, Se, Si, Te, Ag, Al, Au, Ba, Be, Ca, Cd, Co, Cr, Cs, Cu, Fe, Ge, Hf, Hg, Ir, K, Li, Mg, Mn, Mo, Na, Nb, Ni, Os, Pd, Pt, Rb, Re, Rh, Ru, Sb, Sc, Sr, Ta, Ti, V, W, Y, and Zr, and C indicates at least one element from the group consisting of Tl, Br, Cl, F, H, I and P, and wherein e, f, and g are atomic percents with $30 \leq e \leq 95$, $5 \leq f \leq 50$, and $0 \leq g \leq 20$, and at least one of said reflectivity adjustment layer and said recording layer includes a deposit comprising a high melting-point component which is relatively higher in the melting-point than a residual component of said layer, and precipitates of said high melting-point component are porous and said residual component is distributed in holes of said porous precipitates.

51. An optical recording medium according to claim 50, wherein the reflectivity at a portion having a high reflectivity on the recording track is 60% or higher at the time of irradiation of weak light and the reflectivity at the same portion is 40% or lower at the time of irradiation of strong light.

52. An optical recording medium Which is formed on a substrate directly or via a protective layer and records and reads information by a change in a recording layer which is caused by irradiation of a laser beam, wherein said optical recording medium has a reflectivity adjustment layer separate from the recording layer, and the optical constants of the reflectivity adjustment layer are changed by irradiation of light and the reflectivity at the time or irradiation of weak light is relatively higher than the reflectivity at the time of irradiation of strong light, wherein the reflectivity adjustment layer is expressed by the general formula $A_e B_f C_g$, in which A indicates at least one element selected from the group consisting of Sn, Pb, Bi, Zn, Ga, and In, B indicates at least one element selected from the group consisting of As, B, C, N, O, S, Se, Si, Te, Ag, Al, Au, Ba, Be, Ca, Cd, Co, Cr, Cs, Cu, Fe, Ge, Hf, Hg, Ir, K, Li, Mg, Mn, Mo, Na, Nb, Ni, Os, Pd, Pt, Rb, Re, Rh, Ru, Sb, Sc, Sr, Ta, Ti, V, W, Y, and Zr, and C indicates at least one element from the group consisting of Tl, Br, Cl, F, H, I and P, and wherein e, f, and g are atomic percents with $30 \leq e \leq 95$, $5 \leq f \leq 50$, and $0 \leq g \leq 20$, and at least one of said reflectivity adjustment layer and said recording layer includes a deposit comprising a high melting-point component which is relatively higher in the melting-point than a residual component of said layer, and precipitates of said high melting-point component are porous and said residual component is distributed in holes of said porous precipitates, and the maximum dimension of holes of said porous precipitates of said high melting-point component in the direction of a surface of that layer is 80 nm or smaller and the maximum wall thickness of the area between said two neighboring holes in the direction of the surface of said thin film is 20 nm or thinner.

53. An optical recording medium according to claim 52, wherein the reflectivity at a portion having a high reflectivity on the recording track is 60% or higher at the time of irradiation of weak light and the reflectivity at the same portion is 40% or lower at the time of irradiation of strong light.

* * * * *